United States Patent [19]
Sylvan

[11] Patent Number: 5,943,055
[45] Date of Patent: Aug. 24, 1999

[54] COMPUTER INTERFACE METHOD AND SYSTEM

[75] Inventor: Loren M. Sylvan, Denver, Colo.

[73] Assignee: U S West, Inc., Denver, Colo.

[21] Appl. No.: 08/412,312

[22] Filed: Mar. 16, 1995

Related U.S. Application Data

[63] Continuation of application No. 08/035,822, Mar. 23, 1993, abandoned.

[51] Int. Cl.$^6$ ............................. G06F 13/00; G06F 15/00; H04M 11/00
[52] U.S. Cl. .......................... 345/349; 345/339; 345/356; 379/93.17; 379/93.23; 379/201; 455/557
[58] Field of Search ................................ 345/146, 156, 345/112, 349, 339, 351, 356; 395/200, 326–358; 379/93.17, 93.23, 110.01, 201, 204, 206; 455/556, 557, 566

[56] References Cited

U.S. PATENT DOCUMENTS

| | | |
|---|---|---|
| 4,431,870 | 2/1984 | May et al. . |
| 4,659,876 | 4/1987 | Sullivan et al. . |
| 4,712,191 | 12/1987 | Penna . |
| 4,870,677 | 9/1989 | Di Santo et al. . |
| 4,885,580 | 12/1989 | Noto et al. . |
| 4,899,377 | 2/1990 | Bauer et al. . |
| 5,140,677 | 8/1992 | Fleming et al. . |
| 5,140,678 | 8/1992 | Torres . |
| 5,165,012 | 11/1992 | Crandall et al. . |
| 5,179,587 | 1/1993 | Bock et al. . |
| 5,191,644 | 3/1993 | Takeda . |
| 5,202,828 | 4/1993 | Vertelney et al. ...................... 395/159 |
| 5,341,293 | 8/1994 | Vertelney et al. ...................... 395/159 |
| 5,393,964 | 2/1995 | Hamilton et al. ........................ 235/381 |
| 5,477,447 | 12/1995 | Luciw et al. ............................. 364/419 |
| 5,479,491 | 12/1995 | Herrero Garcia et al. ............... 379/88 |
| 5,500,859 | 3/1996 | Sharma et al. ............................. 370/81 |
| 5,546,538 | 8/1996 | Cobbley et al. ......................... 395/200 |
| 5,566,291 | 10/1996 | Boulton et al. .......................... 395/161 |
| 5,568,540 | 10/1996 | Greco et al. ................................ 379/89 |
| 5,572,648 | 11/1996 | Bibayan ................................... 395/340 |
| 5,574,725 | 11/1996 | Sharma et al. ............................. 370/79 |
| 5,579,472 | 11/1996 | Keyworth, II et al. .................. 395/326 |
| 5,594,859 | 1/1997 | Palmer et al. ........................... 395/330 |
| 5,644,735 | 7/1997 | Luciw et al. ............................. 395/338 |
| 5,689,663 | 11/1997 | Williams ................................. 345/349 |

FOREIGN PATENT DOCUMENTS 0354703  2/1990  European Pat. Off. .

OTHER PUBLICATIONS

Khoshafian et al., "Intelligent Offices" pp. 250–255.
Franz, Marty, "Object–Oriented Programming Featuring Actor" pp. 284–285.
Byers et al., "Everyman's Database Primer" 1991, pp. 388–390; May.
"Cannon Navigator Desktop Office", pp. 1–16; and Inbound/Outbound, May 1990.
Cannon Navigator, p. 12 p. 21.

*Primary Examiner*—Jeffery Brier
*Assistant Examiner*—David L Lewis
*Attorney, Agent, or Firm*—Brook & Kushman

[57] ABSTRACT

A method and system are disclosed for processing and presenting graphic objects using a telephone station at which a user is capable of performing a number of functions. The telephone station includes a computer and a display device having a display screen adapted to cooperate with a pointing device. The method includes displaying graphic objects including foreground and background icons on the display screen. The method also includes selecting one of the foreground icons using the pointing device to identify a desired application, and displaying an application window containing graphic objects representing the functions of the desired application. The method further includes selecting one of the graphic objects using the pointing device to identify the function to be performed.

16 Claims, 20 Drawing Sheets

COMPUTER INTERFACE METHOD AND SYSTEM

CROSS-REFERENCE TO RELATED APPLICATION

This application is a continuation of U.S. Ser. No. 08/035,822, which was filed Mar. 23, 1993, abandoned.

This invention is related to a commonly owned application under U.S. Ser. No. 08/035,841 which was filed Mar. 23, 1993 and is entitled "Method And System For Searching An On-Line Directory At A Telephone Station."

TECHNICAL FIELD

This invention relates to methods and systems for processing and presenting information and, in particular, to methods and systems for processing and presenting information at a telephone station.

BACKGROUND ART

Currently, extended telephone services are available using products offered by a number of service providers. Some of the most successful products include CompuServe, Dialog, Prodigy and AT&T Smart Phone 2100. These products permit a user to access a number of different information services using a telephone line and a remote computer.

While these products have had limited commercial success, they have significant disadvantages. These products generally require a user to establish communication with the service provider every time the user wishes to use the product. These products also require considerable training to educate a new user on the proper use of the product (i.e. commands). In addition, these products are based on textual input which require the user to use either a physical keyboard or a graphic on-screen keyboard.

A need therefore exists for a product which addresses the shortcomings of the products presently available. A need exists for a product which provides a user interface which is intuitive enough to permit a new user to begin using the product without extensive training. Furthermore, a need exists for a product which does not require the use of a keyboard.

SUMMARY OF THE INVENTION

The present invention described and disclosed herein comprises a method and system for processing and presenting graphic objects at a telephone station upon receiving input through a display screen adapted to cooperate with a pointing device.

An object of the present invention is to provide a method and system for processing and presenting graphic objects at a telephone station using an intuitive user interface.

Another object of the present invention is to provide a relatively simple and flexible method and system for processing and presenting graphic objects at a telephone station which enhances one user's ability to communicate with other users.

In carrying out the above objects and other objects of the present invention, a method is provided for processing and presenting graphic objects at a telephone station. The method includes the step of displaying background icons on the display screen of the telephone station. Each background icon represents an application category. The method also includes displaying foreground icons. Typically, the foreground icons are smaller than the background icons and the foreground icons are superimposed over the associated background icons. Each background icon represents a group of related applications. Each foreground icon represents an application having one or more functions. In some embodiments, the method might also include displaying an advertising window.

The method further includes selecting the foreground icon which represents the desired application using the display screen and the pointing device. It is preferable, although not necessary, to use a touch sensitive display screen. The pointing device could range from an electronic stylus to a human finger. Once the foreground icon is selected, the method requires displaying an application window on the display screen. The application window contains graphic objects such as buttons, icons, graphic tablets and text. Each graphic object represents a specific function.

In some embodiments, it may be necessary to redisplay the background and foreground icons in order to accommodate the application window. It may further be necessary to alter the size of the background and foreground icons to accommodate the application window. Preferably, once the application window is displayed, the selected foreground icon is visually highlighted.

Finally, the method includes the step of identifying the specific function to be performed by using the pointing device to select the appropriate graphic object on the display screen. In some cases, the user must supply additional data in order to complete the identified function. In this event, at least one input object will be displayed prompting the user to input the additional data. After the user has input the data using the pointing device, the preferred method includes transmitting the input data to the computer for processing. Input data can take many forms. The input data may be a hand written message created using the pointing device. The input data may also be analog audio data which is converted into digital audio data and transmitted to the computer.

In carrying out the above objects and other objects of the present invention, a system is also provided for carrying out the steps of the above described method. The system includes the hardware and software necessary to implement the method and could include a touch sensitive screen and an electronic stylus.

The above objects and other objects, features and advantages of the present invention are readily apparent from the following detailed description of the best mode for carrying out the invention when taken with the accompanying drawings.

DETAILED DESCRIPTION OF THE DRAWING FIGURES

In order to simplify the description of the present invention and to provide a concise description of the best mode for practicing this invention, it will be described in connection with a specific operating environment. This user interface is best implemented on a telephony device with either a gray-scale or color graphical display. The telephony device must employ an operating system capable of sending and receiving telephony switch signalling that enables services such as voice messaging, call waiting, three way calling, and other standard services. In addition, a protocol is necessary to provide the information services described in this document.

The telephony device must provide a way for the user to interact with the information on the screen. Possible modes of interaction include a mouse, a touch screen, an electronic stylus or a speech recognition device. The described interface is not dependent on a single interaction mode—rather, each mode can be used based on user preference.

The present invention may be implemented on any of a number of commercially available CPEs. Such CPEs include, for example, an Apple MacIntosh, a Sharp Wizzard with a communication card and a Radish CPE, commercially available for less than $200.00, manufactured by a company based in Boulder, Colo. The preferred CPE is an Apple MacIntosh.

The selection of a specific CPE is, to some extent, a marketing decision not a technical decision. Because the present invention can be implemented on any number of existing CPEs, the selection of a specific CPE may be based on what is commercially appealing. A commercially appealing CPE might be the most popular CPE, or it might be a CPE which supports functions, other than those required by the present invention, which users find desirable.

For the purposes of this description, selecting refers to a specific action performed by the user of the ATIS. To select an object, the user touches the object with the electronic stylus. To double-select an object, the user touches the object twice with the electronic stylus.

Figure 1:
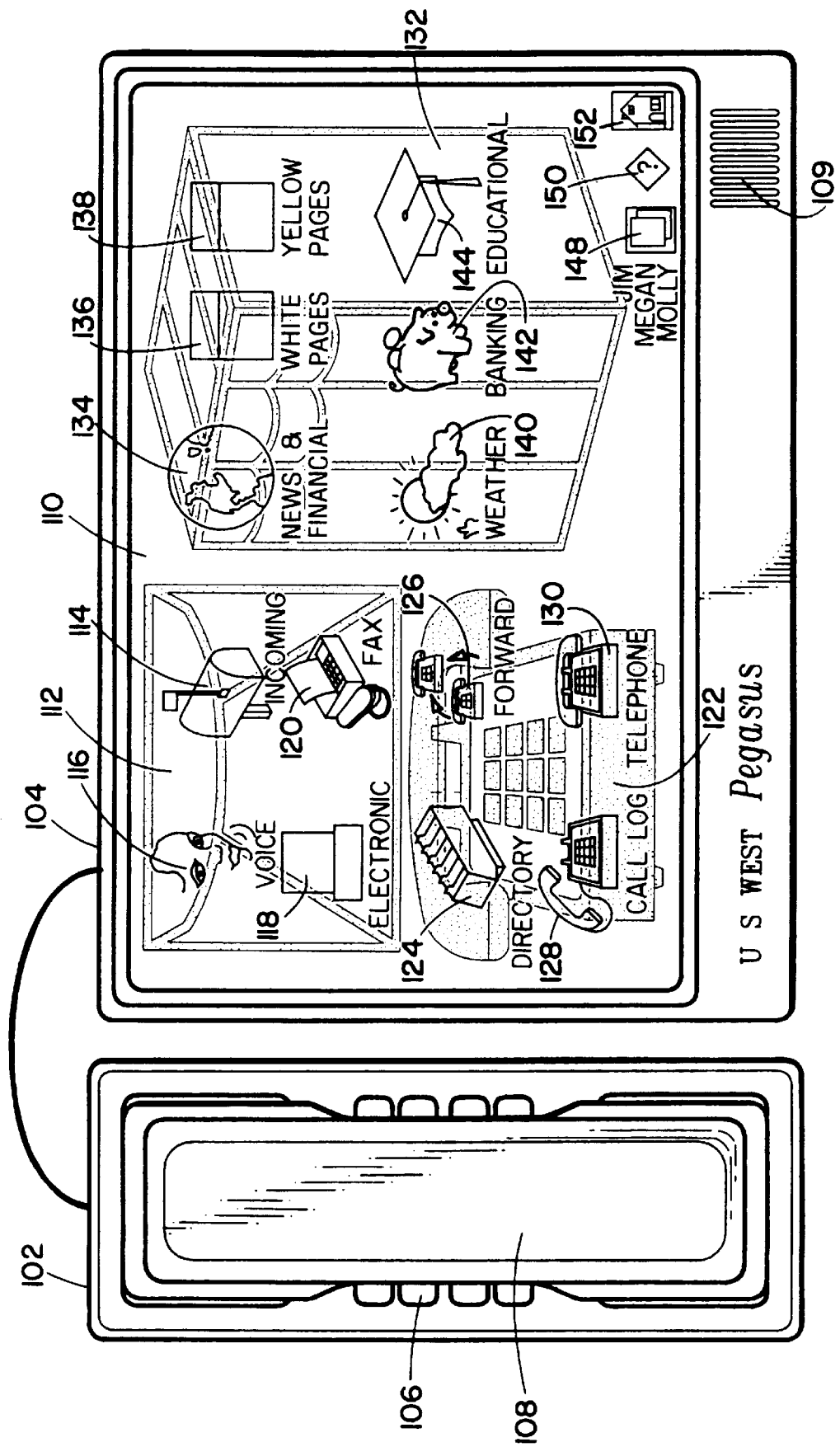
FIG. 1 is a screen display, hereinafter referred to as the Main Application Screen illustrating the user interface method used by the present invention.

FIG. 1 shows the Customer Premises Equipment ("CPE") of the preferred embodiment displaying the Main Application Screen. The CPE comprises telephone station 102 connected to a display device 104. The telephone station 102 includes a telephone keypad 106 and a telephone handset 108. In order to assist the user in making intuitive selections without the need for reference materials or training, the display device 104 has a built-in microphone 109 and a display screen 110 which contains three background icons: an envelope icon 112, a telephone icon 122, and a reference icon 132.

Superimposed over each of the background icons, are a number of foreground icons. Each of these foreground icons represent an application which generally relates to the subject suggested by the background icon. The four foreground icons over the envelope icon 112 relate to mail services; the four foreground icons over the telephone icon 122 generally relate to telephone services; and the six foreground icons over the reference icon 132 generally relate to information services.

Each foreground icon represents an application having a group of related functions. When a user selects a foreground icon using the electronic stylus of the preferred embodiment, all of the displayed foreground icons representing applications are reduced in size and relocated to the leftmost portion of the desk top to create room for an application window. The selected foreground icon is visually highlighted using a box and the application window is opened over the right hand portion of the display screen 110. The application window contains elements which permit the user to perform functions represented by the selected foreground icon. Specific application windows are shown in FIGS. 2–16 and are described in detail below.

Mail Services

Foreground icon 114 represents functions associated with incoming mail. Selecting foreground icon 114 permits the user to view and edit the list of messages received through voice mail, email or fax mail. Selecting this icon further permits the user to respond to incoming mail by creating, editing and sending messages via voice mail, email or fax mail. The discussion thereof FIG. 2 below more specifically describes the functions of the incoming mail application.

Foreground icon 116 represents functions associated with voice mail. Selecting foreground icon 116 permits the user to create, edit and send voice mail messages to other users. The discussion of FIG. 3 below more specifically describes the functions of the voice mail application.

Foreground icon 118 represents functions associated with email. Selecting foreground icon 118 permits the user to create, edit and send email messages to other users. The discussion of FIG. 4 below more specifically describes the functions of the email application.

Foreground icon 120 represents functions associated with fax mail. Selecting foreground icon 120 permits the user to create, edit and send fax mail messages to other users. The discussion of FIG. 5 below more specifically describes the functions of the fax mail application.

Telephone Services

Foreground icon 124 represents the personal directory application which permits the user to perform functions associated with the user's personal telephone directory. Selecting foreground icon 124 allows the user to add, delete, edit and search for entries in the user's personal telephone directory. The discussion of FIG. 6 below more specifically describes the functions of the personal directory application.

Foreground icon 126 represents the call forward application which permits the user to perform functions associated with forwarding calls to another telephone station. Selecting foreground icon 126 allows the user to change the call forward status and select the call forward station number. The discussion of FIG. 7 below more specifically describes the functions of the call forward application.

Foreground icon 128 represents the call log application which permits the user to perform functions associated with tracking calls initiated at the user's telephone station. Selecting foreground icon 128 allows the user to view the entries of the call log, add entries to the user's personal directory, delete entries from the call log and dial numbers listed in the call log. The discussion of FIG. 8 below more specifically describes the functions of the call log application.

Foreground icon 130 represents the telephone services application which permits the user to perform functions associated with using special telephone features. Selecting foreground icon 130 allows the user to view the name and number of the telephone station to which the user's telephone is connected. This application further permits the user to view the name and number of incoming calls, answer incoming calls, create a three way connection, or direct incoming calls to a voice message service. The discussion of FIG. 9 below more specifically describes the functions of the telephone services application.

Reference Services

Foreground icon 134 represents the news and financial services application which permits the user to perform functions associated with accessing news and financial information. Selecting foreground icon 134 allows the user to view and edit a list of news profiles, view and edit a list of financial profiles, view a list of article titles, and select a specific article to read. The discussion of FIG. 10 below more specifically describes the functions of the news and financial services application.

Foreground icon 136 represents the white pages application which permits the user to perform functions associated with using an on-line white pages telephone directory. Selecting foreground icon 136 allows the user to search the white pages directory for a particular person using a two tiered search technique. The first search allows the user to designate the last name of the person. The second search allows the user to locate the telephone number of the person by searching for the person's first name within a list of entries having the designated last name. The discussion of FIGS. 11 and 12 below more specifically describes the user interface and functionality of the white pages application.

Foreground icon 138 represents the yellow pages application which permits the user to perform functions associated with using an on-line yellow pages telephone directory.

Selecting foreground icon 138 allows the user to search the yellow pages directory for a particular company name using a two tiered search technique. The first search allows the user to designate a category which describes the business of the company. The second search allows the user to locate the telephone number of the company by searching for the company name within the designated category. The discussion of FIGS. 13 and 14 below more specifically describes the user interface and functionality of the yellow pages application.

Foreground icon 140 represents the weather services application which permits the user to perform functions associated with accessing data from the National Weather Service or other relevant weather services. Selecting foreground icon 140 allows the user to select and view a variety of maps to access weather information relating to different geographic areas. The discussion of FIG. 15 below more specifically describes the functions of the weather services application.

Foreground icon 142 represents the banking services application which permits the user to perform functions associated with banking. Selecting foreground icon 142 allows the user to view a list of financial institutions, review account information and effect financial transactions. The discussion of FIG. 16 below more specifically describes the functions of the banking services application.

Other Elements

Four other elements of the Main Application Screen are displayed at the bottom of the display screen 110. These four elements are always present on the display screen 110 and may be selected by the user at any time.

In the lower right of the display screen 110 is a group of three functional icons. The first functional icon is the home memo icon 148. Selecting this icon permits the user to send messages to and receive messages from other family members. The discussion of FIG. 17 below more specifically describes the functions of the family notepad application.

The second functional icon is the help icon 150. Selecting this icon permits the user to use the on-line help screens to gain knowledge regarding the use of the ATIS. To receive help, the user must select an object on screen about which the user desires more information and then select the help icon 150. For example, if the user wanted to know something about mail services in general, the user could select background icon 112, the letter icon, and select the help icon 150.

The third functional icon is the main screen icon 152. Selecting this icon allows the user to exit the application which is currently displayed on the display screen 110 and return to the Main Application Screen.

Incoming Mail Screen

Figure 2:
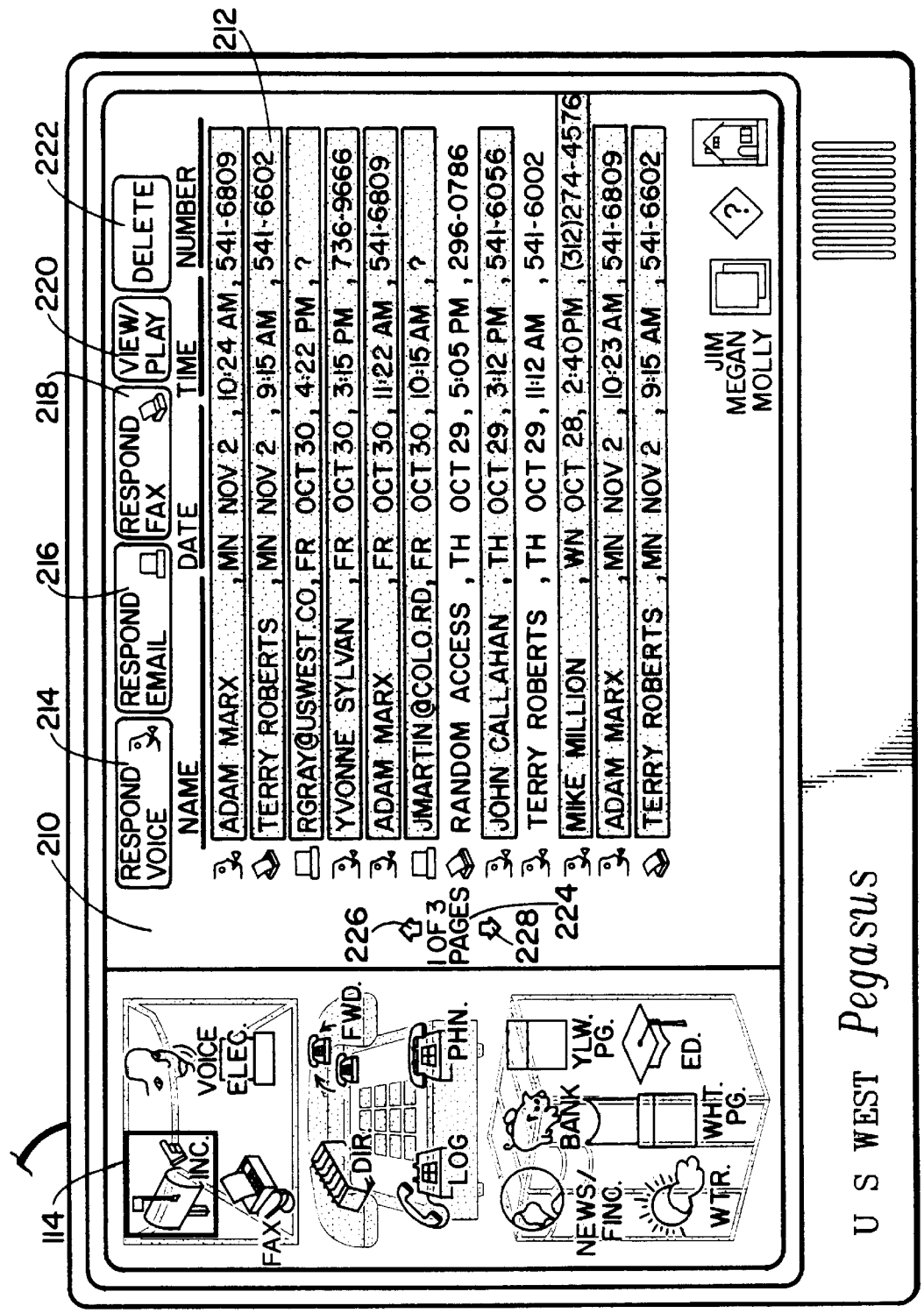
FIG. 2 is a screen display, hereinafter referred to as the Incoming Mail Screen illustrating the user interface method used by the present invention.

FIG. 2 shows the Incoming Mail Screen of the ATIS which is displayed when the user selects the incoming mail icon 114. The Incoming Mail Screen incorporates all of the elements of the Main Application Screen with the addition of an incoming mail window 210 shown on the right hand portion of the screen.

The incoming mail window 210 contains an incoming mail list 212. Each entry in the incoming mail list 212 indicates the type of mail (voice, fax or electronic), the name of the sender, the date and time the mail was received and the telephone number from which the mail was sent. The user may select and de-select any entry in the incoming mail list 212.

The five buttons near the upper portion of the incoming mail window 210 perform functions on a selected entry in the incoming mail list 212. Selecting the "Respond Voice"

button 214 permits the user to send a voice mail message to the number of the selected entry in the incoming mail list 212. Likewise, selecting the "Respond Email" button 216 permits the user to send an email message to the number of the selected item of the incoming mail list 212; and selecting the "Respond Fax" button 218 permits the user to send a fax mail message to the number of the selected item of the incoming mail list 212.

Selecting the "Forward" button 220 permits the user to send a copy of the mail represented by the selected item of the incoming mail list 212 to another user. Selecting the "Delete" button 222 permits the user to delete the selected item from the incoming mail list 212.

On the left side of the incoming mail window 210 is a set of page controls consisting of three elements. Page indicator 224 displays the length of the incoming mail list 212 in pages as well as the currently displayed page number. The purpose of the page indicator 224 is to provide the user with instant access to the displayed page information making the ATIS easy to use.

The Page Up object 226 can be selected by the user to cause the previous page of the incoming mail list 212 to be displayed in the incoming mail window 210. If the first page of the incoming mail list 212 is displayed when the Page Up object is selected, the selection will have no effect.

The Page Down object 228 can be selected by the user to cause the next page of the incoming mail list 212 to be displayed in the incoming mail window 210. If the last page of the incoming mail list 212 is displayed when the Page Down object is selected, the selection will have no effect.

Voice Mail Screen

Figure 3:
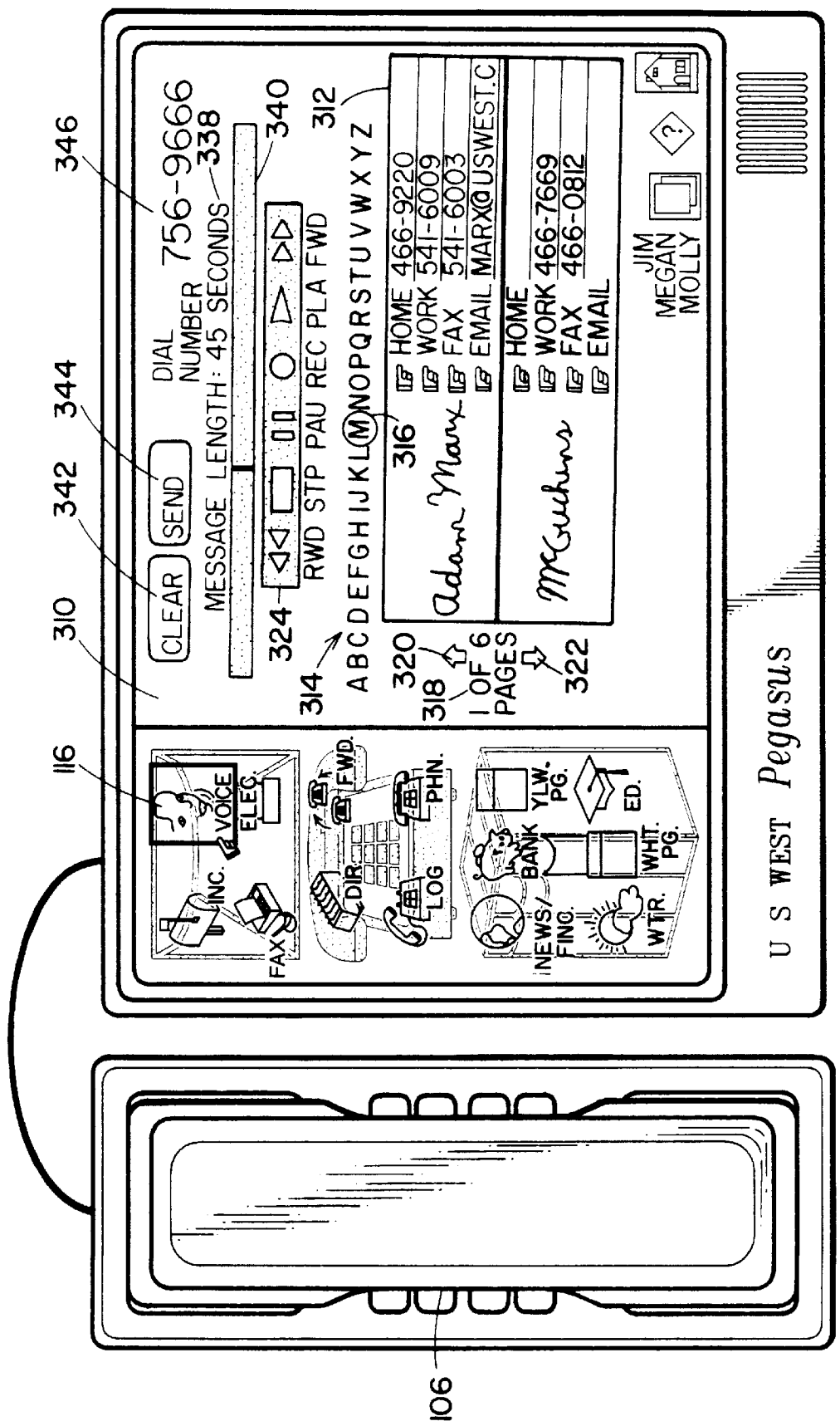
FIG. 3 is a screen display, hereinafter referred to as the Voice Mail Screen illustrating the user interface method used by the present invention.

FIG. 3 shows the Voice Mail Screen of the ATIS which is displayed when the user selects the voice mail icon 116. The Voice Mail Screen allows the user to perform functions associated with sending a voice mail message to another user. The Voice Mail Screen incorporates all of the elements of the Main Application Screen with the addition of an voice mail window 310 shown on the right hand portion of the display screen 110.

The voice mail window 310 contains a personal directory list 312 which permits the user to view and select a number from the user's personal directory. After the user has selected a number from the personal directory list 312, the selected number is displayed as the Dial Number 346 in the upper right portion of the display screen. If the user wishes to set the Dial Number 346 to a number which is not listed in the user's personal directory, the user may set the Dial Number 346 by manually dialing the desired number using the telephone keypad 106.

The personal directory list 312 display is based on the position of the letter indicator 316 relative to the array of characters 314. As shown in FIG. 2, the personal directory list 312 has displayed entries indexed under the letter "M" because the letter indicator 316 is positioned over the letter "M". The user may use the stylus to position the letter indicator 316 over the desired letter.

Page controls 318–322 provide the user with the ability to page through the personal directory list 312. The page controls operate in the same manner as the previously described page controls and relate only to the entries in the personal directory which are indexed according to the letter under the letter indicator 316.

A set of message controls 324 are displayed directly above the array of characters 314. The set of message controls 324 includes six individual buttons which allow the user to record, edit and play the message the user wishes to send. The message length 338 and a message pointer 340 indicating the current editing position are displayed above the message controls 324. These elements help the user to easily record and edit a satisfactory voice mail message.

To begin recording a message, the user must use the stylus to press the "REC" button and must speak into the built-in microphone 109. All sound detected by the built-in microphone 109 is digitally recorded by the ATIS. The "STP" button may be pressed by the user to stop the operation of any other previously pressed message control button.

The "RWD" button allows the user to move the message pointer toward the beginning of the recorded message. This is not only useful for positioning the message pointer in order to play the recorded message, but also for positioning the message pointer in order to re-record portions of the message.

The "FWD" button allows the user to move the message pointer toward the end of the recorded message. This can be useful for positioning the message pointer to a portion of the message which the user wishes to re-record.

The "PLA" button allows the user to play the recorded message from the current message pointer position. To interrupt the Play or Record function, the user may press the "PAU" button. The "PAU" button, unlike the "STP" button, is only effective when used in conjunction with either the "PLA" button or the "REC" button. To resume the Play or Record function, the user must press the "PAU" button a second time. If the user wishes to clear the current recorded message, the user must press the "CLEAR" button 342. To send the current recorded message, the user must press the "SEND" button 344.

Email Screen

Figure 4:
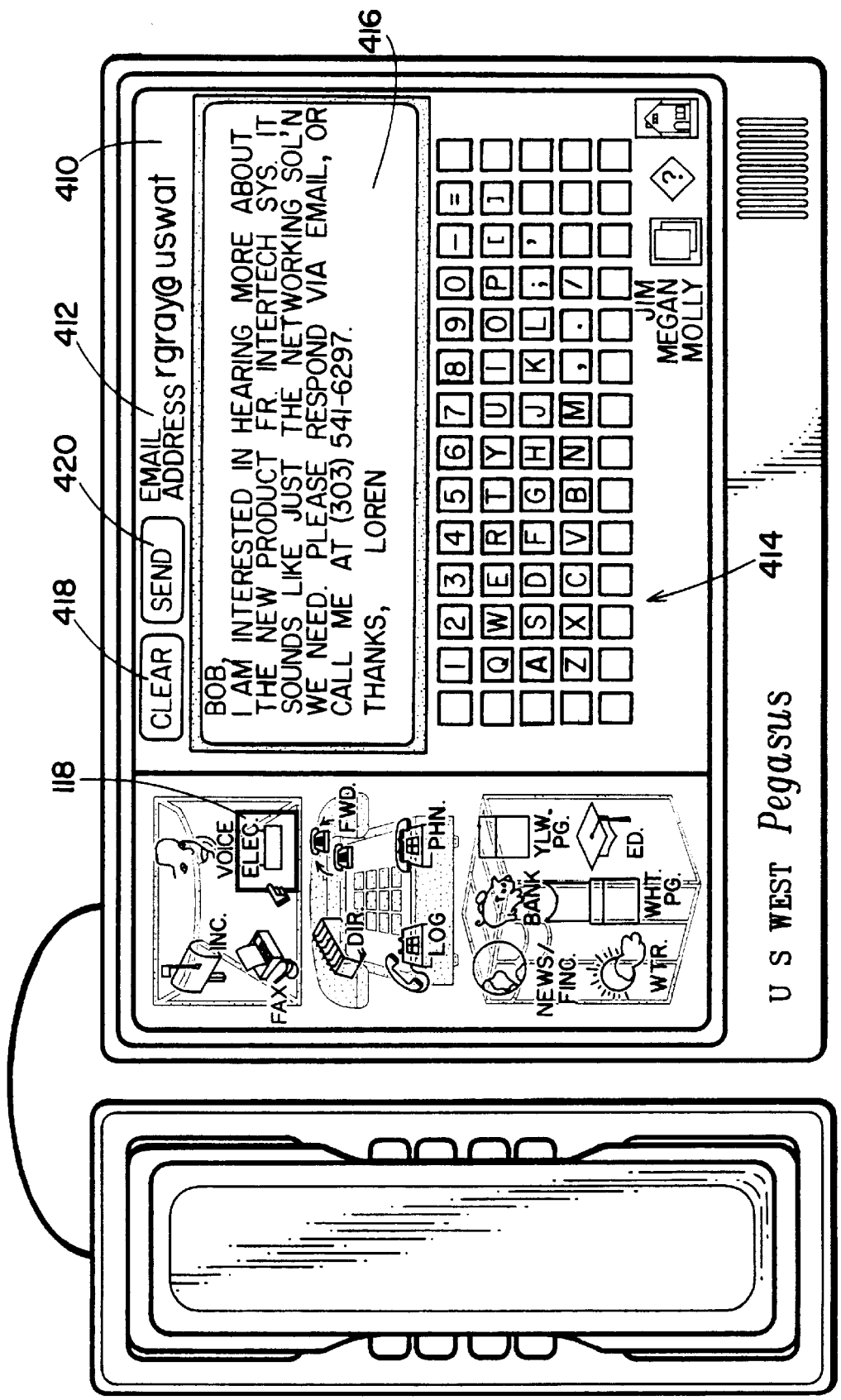
FIG. 4 is a screen display, hereinafter referred to as the Electronic Mail (hereinafter "Email") Screen illustrating the user interface method used by the present invention.

FIG. 4 shows the Email Screen of the ATIS which is displayed when the user selects the email icon 118. The Email Screen allows the user to perform functions associated with sending an email message to another user. The Email Screen incorporates all of the elements of the Main Application Screen with the addition of an Email window 410 shown on the right hand portion of the display screen 110.

The Email window 410 contains an Email Address 412, a graphic keyboard 414, a message display area 416, a "Clear" button 418 and a "Send" button 420. To define the Email Address 412, the user may utilize the graphic keyboard 414 to enter an Email Address or the user may select an Email entry from the personal directory which is more fully described in the discussion referring to FIG. 6 below.

The graphic keyboard 414 displayed in the lower right hand portion of the screen allows the user to create and edit an email message. Selecting individual graphic buttons with the stylus causes the letter to be added to the email message at the cursor location and further causes the letter to be displayed at the appropriate location in the message display area 416.

Selecting the "Clear" button 418 allows the user to completely erase the currently displayed email message. After the display area is cleared, the user may begin creating a new email message.

Once the user is satisfied with the email message, the message can be sent by selecting the "Send" button 420. This causes the email message to be delivered to the previously defined Email Address 412.

Fax Mail Screen

Figure 5:
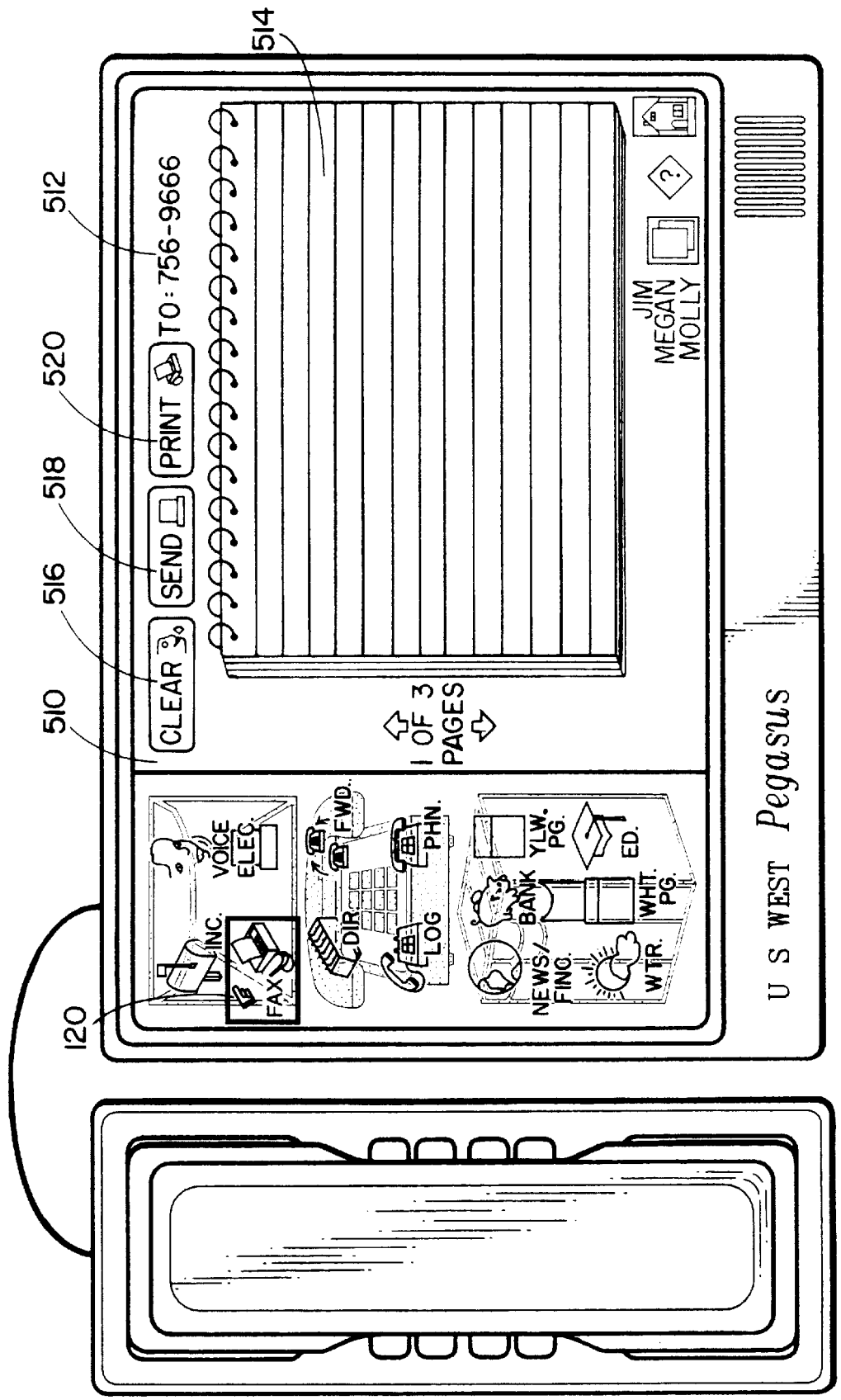
FIG. 5 is a screen display, hereinafter referred to as the Fax Mail Screen illustrating the user interface method used by the present invention.

FIG. 5 shows the Fax Mail Screen of the ATIS which is displayed when the user selects the fax mail icon 120. The Fax Mail Screen allows the user to perform functions associated with sending a fax mail message to another user. The Fax Mail Screen incorporates all of the elements of the Main Application Screen with the addition of a fax mail window 510 shown on the right hand portion of the display screen 110.

The fax mail window 510 contains a Destination Station Number 512, a graphic writing tablet 514, a "Clear" button 516, a "Send" button 518 and a "Print" button 520. To define the Dial Number 512, the user may utilize the telephone keypad 106 or the user may select a fax entry from the personal directory which is more fully described in the discussion referring to FIG. 6 below.

The graphic writing tablet 514 allows the user to create a fax mail message using the stylus of the preferred embodiment. The user must simply use the stylus to write on the graphic writing tablet 514 as one would use a pen to write on a pad of paper.

Selecting the "Clear" button 516 allows the user to completely erase the currently displayed fax mail message that appears on the graphic writing tablet 514. After the fax mail message is cleared, the user may begin creating a new fax mail message.

If the user wishes to print a copy of the fax mail message the user created, the user may select the "Print" button 520. Selecting this button causes the fax mail message to be printed by an attached printer or fax machine.

Once the user is satisfied with the fax mail message, the message can be sent by selecting the "Send" button 518. This causes the fax mail message to be delivered to the previously defined Dial Number 512.

Personal Directory Screen

Figure 6:
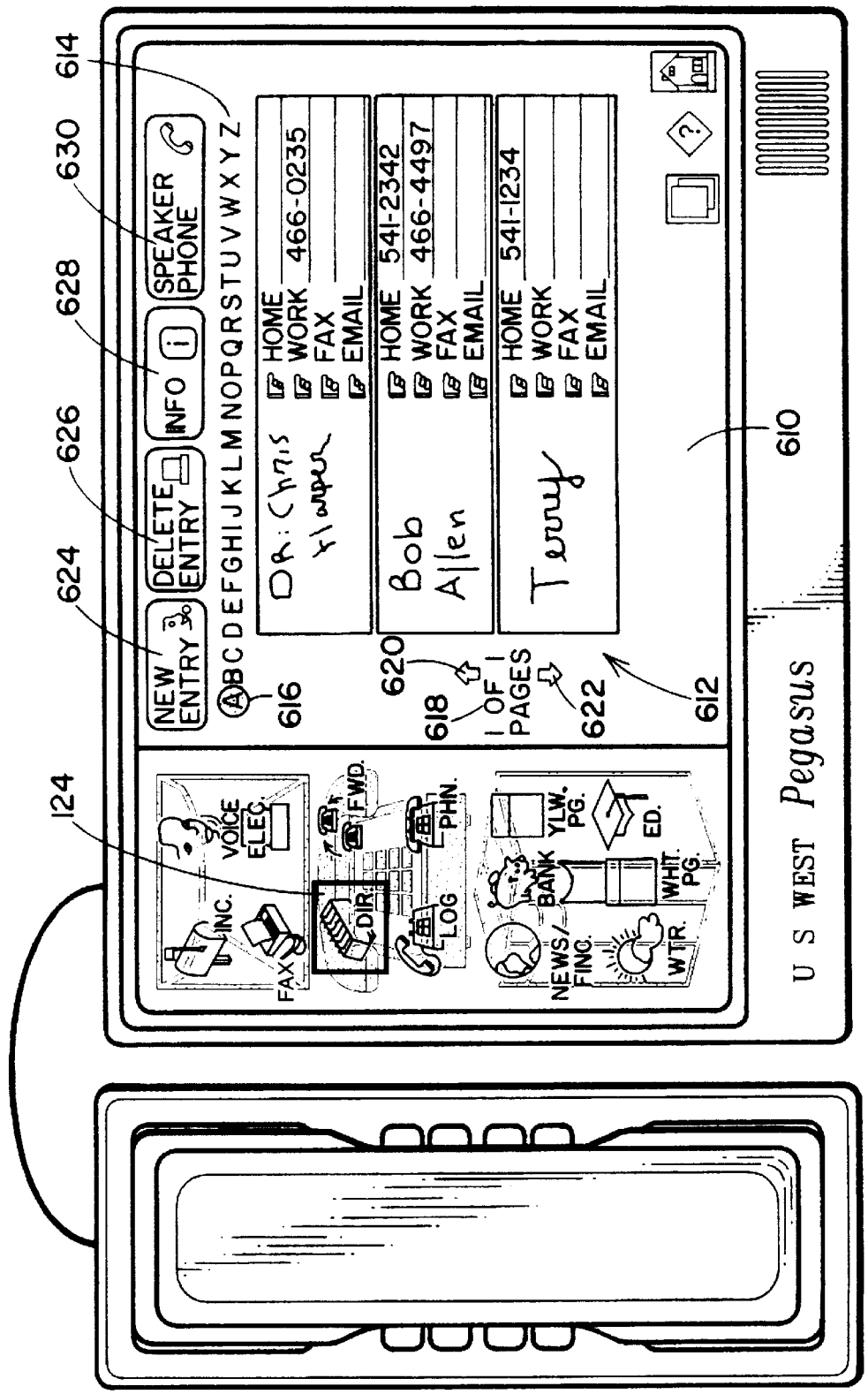
FIG. 6 is a screen display, hereinafter referred to as the Personal Directory Screen illustrating the user interface method used by the present invention.

FIG. 6 shows the Personal Directory Screen of the ATIS which is displayed when the user selects the personal directory icon 124. The Personal Directory Screen allows the user to perform functions associated with adding, deleting, modifying and viewing personal directory entries. The Personal Directory Screen incorporates all of the elements of the Main Application Screen with the addition of a personal directory window 610 shown on the right hand portion of the display screen 110.

The personal directory window 610 contains a personal directory list 612, an array of characters 614, a letter indicator 616, a set of page controls 618–622, a "New Entry" button 624, a "Delete Entry" button 626, an "Information" button 628 and a "Speaker Phone" button 630. The personal directory list 612 permits the user to view and select a number from the user's personal directory.

Each entry in the personal directory contains the following fields: identification, home telephone number, work telephone number fax number and email address fields. To edit the information of an entry in the personal directory, the user must double-select the entry to cause the directory edit screen to appear. The directory edit screen is described in detail with respect to FIG. 6a.

As explained in relation to FIG. 3, the display of the personal directory list 612 is based on the position of the letter indicator 616 relative to the array of characters 614. The user may use the stylus to position the letter indicator 616 over the desired letter.

The page controls 618–622 allow the user to page through the personal directory list 612. The page controls 618–622 operate in the same fashion as previously describe page controls.

To add an entry to the personal directory list, the user must press the "New Entry" button 624. A new entry is added to the personal directory and is indexed according to the letter under the letter indicator 616. Upon selecting the "New Entry" button 624, the user is prompted to supply information for the associated fields regarding the new entry.

To delete an entry from the personal directory list, the user must select the entry to be deleted and must press the "Delete Entry" button 626. To view more information associated with an entry in the personal directory list 612, the user must select the desired entry and must press the Information button 628. To activate the speaker phone of the invention, the user must press the "Speaker Phone" button 630.

Directory Edit Screen

Figure 6A:
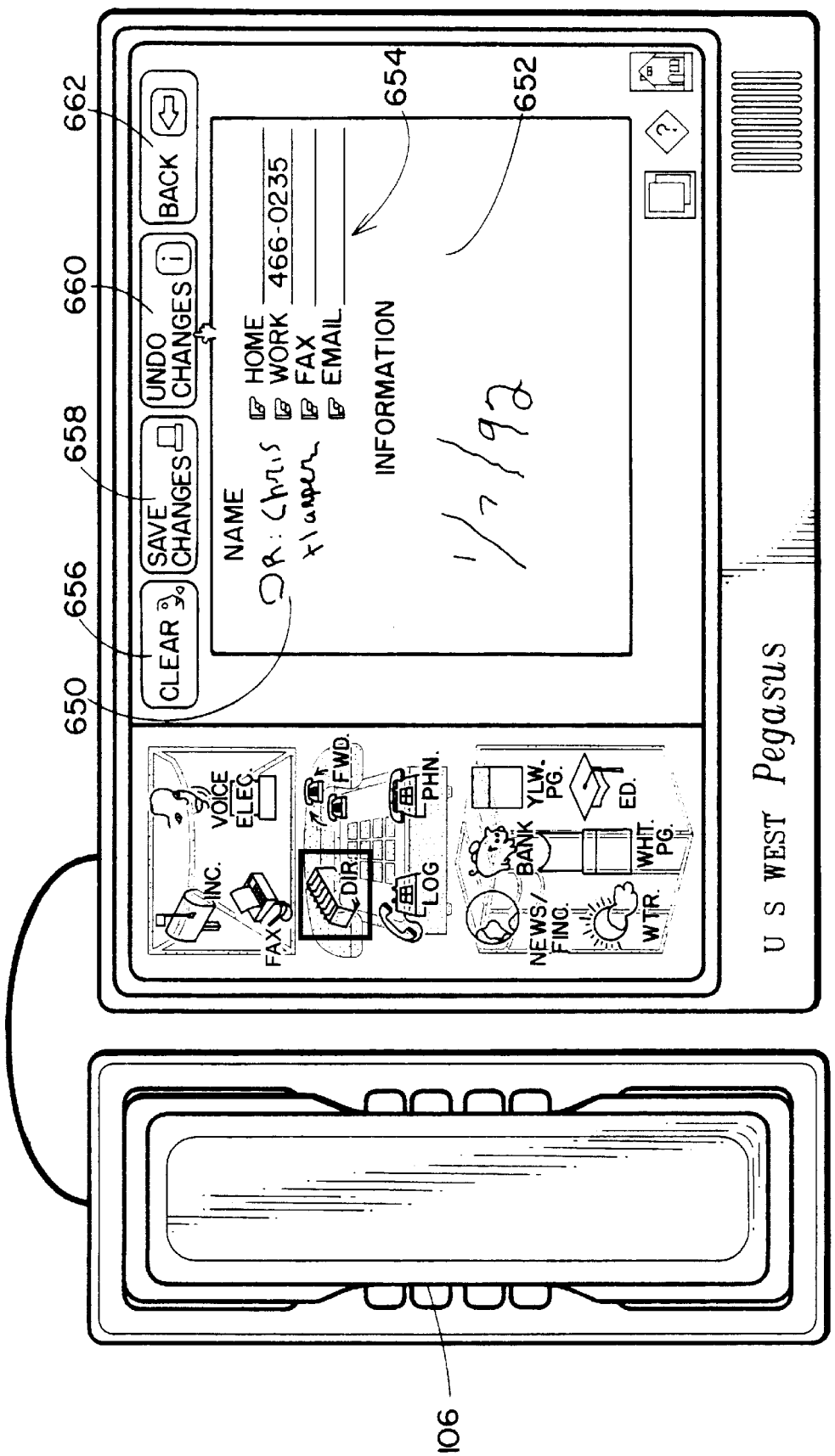
FIG. 6a is a screen display hereinafter referred to as the directory edit screen illustrating the user interface method used by the present invention.

FIG. 6a shows the directory edit screen which is displayed after the user double-selects an entry in the personal directory list. The directory edit screen allows the user to alter the name 650 or information 652 using an electronic stylus. To alter any of the identification fields 654, the user must select the desired field and enter the appropriate number using the numeric keypad 106.

To clear all information related to the displayed entry, the user must press the "CLEAR" button 656. To save any changes, the user must press the "SAVE CHANGES" button 658. To restore the data to the state it was in upon displaying the directory edit screen, the user must press the "UNDO CHANGES" button 660. To return to the previously displayed screen, the user must press the "BACK" button 662.

Call Forward Screen

Figure 7:
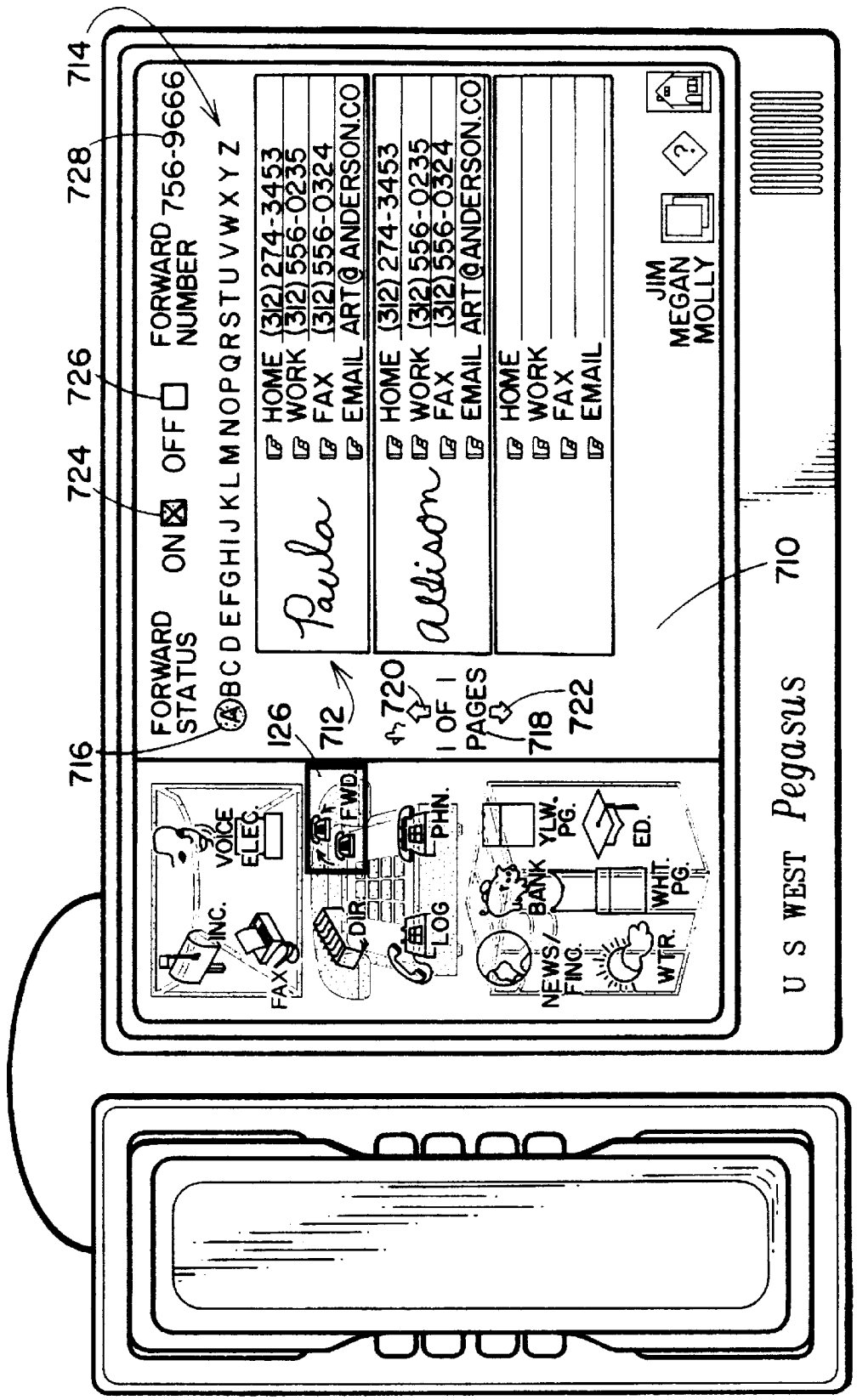
FIG. 7 is a screen display, hereinafter referred to as the Call Forward Screen illustrating the user interface method used by the present invention.

FIG. 7 shows the Call Forward Screen of the ATIS which is displayed when the user selects the call forward icon 126. The Call Forward Screen allows the user to perform functions associated with forwarding calls received at the user's telephone station. The Call Forward Screen incorporates all of the elements of the Main Application Screen with the addition of a call forward window 710 shown on the right hand portion of the display screen 110.

The call forward window 710 contains a personal directory list 712, an array of characters 714, a letter indicator 716, a page indicator 718, a page up object 720, a page down object 722, a Forward Status On box 724, a Forward Status Off box 726 and a Forward Number 728. The personal directory list 712, the array of characters 714, the letter indicator 716, the page indicator 718, the page up object 720 and the page down object 722 perform functions which are described more fully in the discussion of FIG. 6 above To define the Forward Number 728, the user may utilize the telephone keypad 106 or the user may select an entry from the personal directory 712. Selecting the Forward Status On box 724 enables the call forward function of the ATIS and displays an "X" in the Forward Status On box 724. Selecting the Forward Status Off box 726 disables the call forward function of the ATIS and displays an "X" in the Forward Status Off box 726.

Call Log Screen

Figure 8:
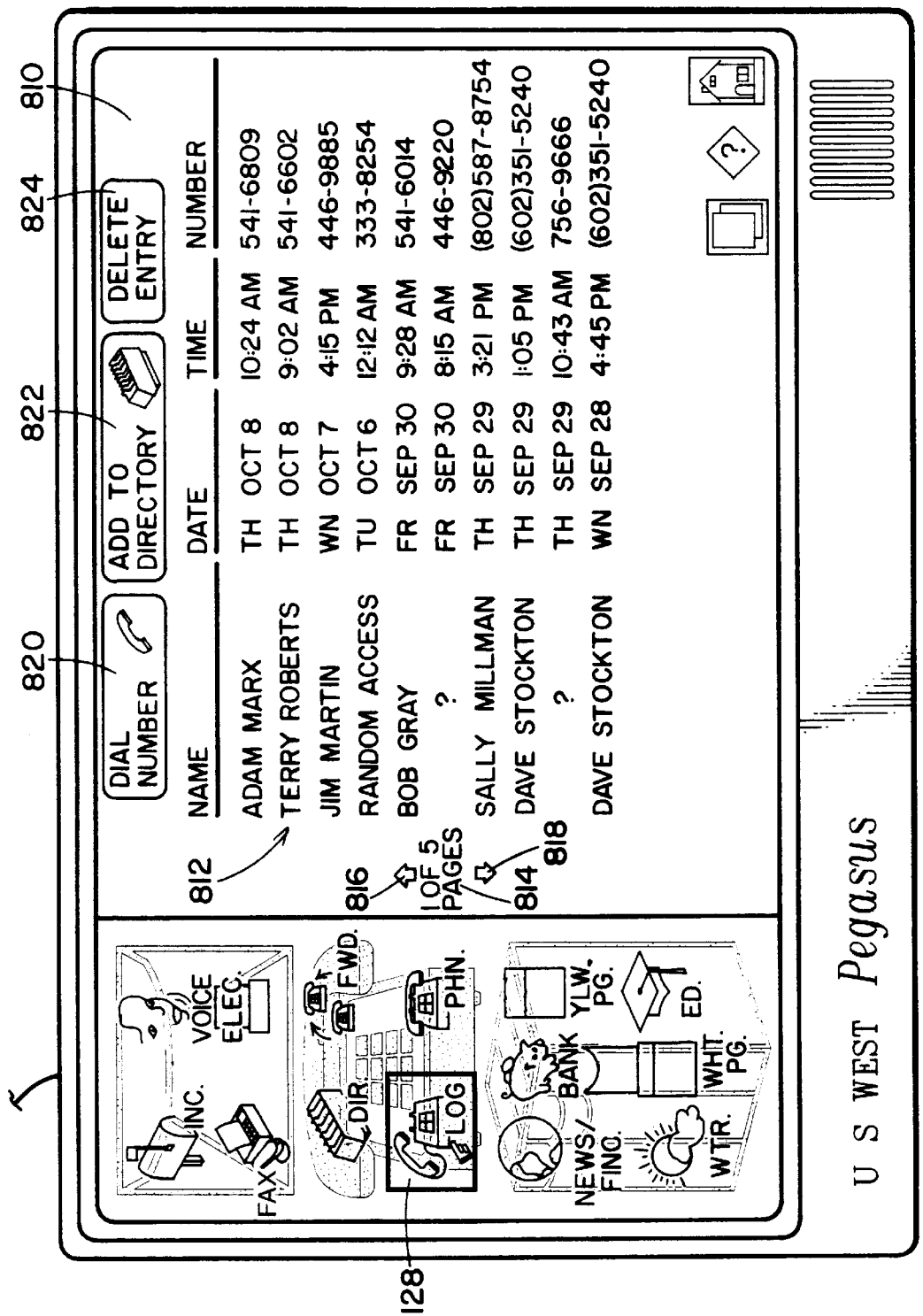
FIG. 8 is a screen display, hereinafter referred to as the Call Log Screen illustrating the user interface method used by the present invention.

FIG. 8 shows the Call Log Screen of the ATIS which is displayed when the user selects the call log icon 128. The Call Log Screen allows the user to perform functions associated with tracking the calls received at the user's telephone station. The Call Log Screen incorporates all of the elements of the Main Application Screen with the addition of a call log window 810 shown on the right hand portion of the display screen 110.

The call log window 810 contains a received call list 812, a set of page controls 814–818, a "Dial Number" button 820, an "Add To Directory" button 822 and a "Delete Entry" button 824. Each entry in the received call list 812 consists of the name, date, time and number of a received call. The page controls operate in the previously described manner.

To dial the number of an entry in the received call list 812, the user may select the desired entry from the received call list 812 and select the "Dial Number" button 820. To add an entry in the received call list 812 to the user's personal directory the user may select the desired entry from the received call list 812 and select the "Add To Directory" button 822. To remove an entry from the received call list 812 the user may select the desired entry from the received call list 812 and select the "Delete Entry" button 824.

Telephone Services Screen

Figure 9:
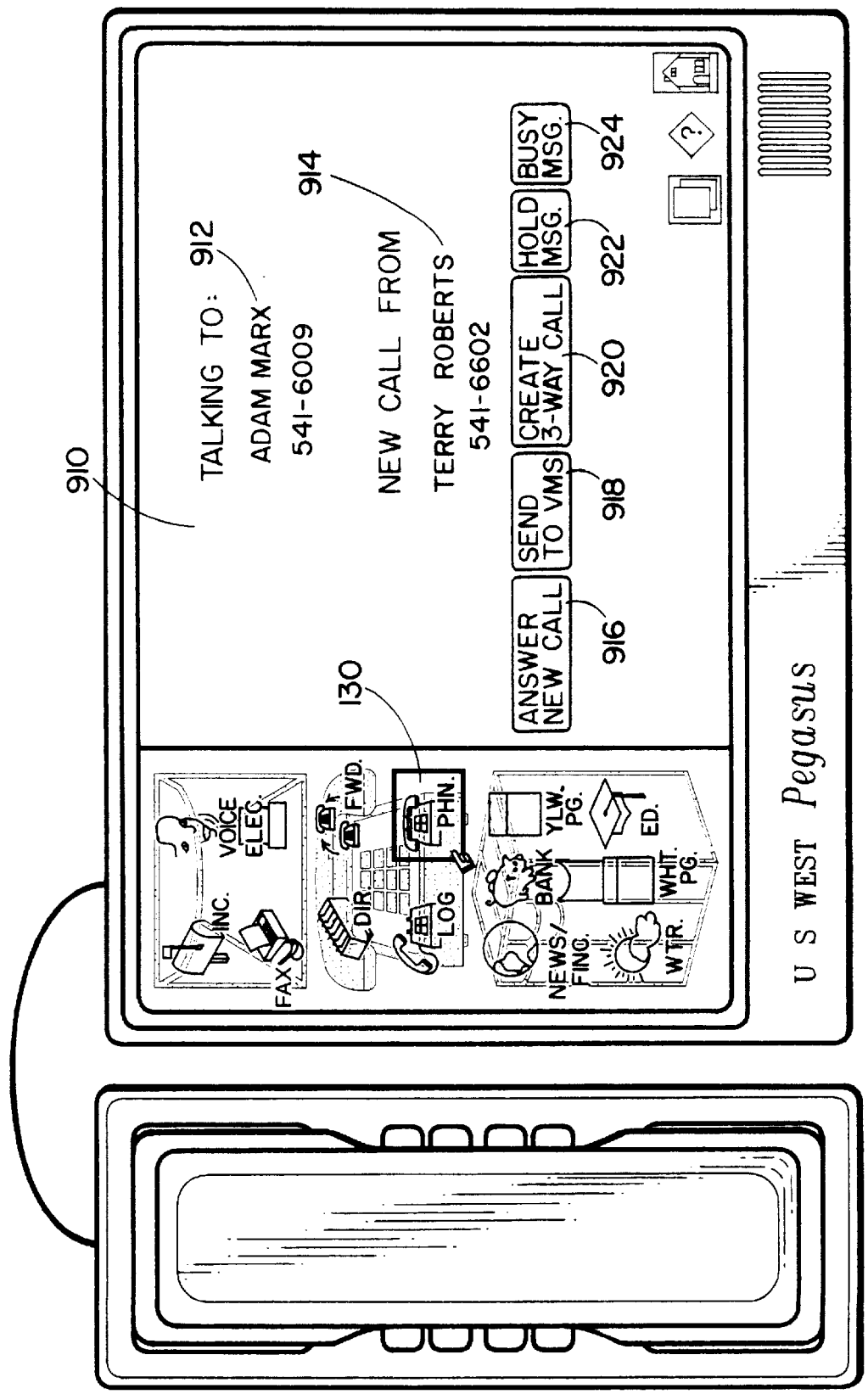
FIG. 9 is a screen display, hereinafter referred to as the Telephone Services Screen illustrating the user interface method used by the present invention.

FIG. 9 shows the Telephone Services Screen of the ATIS which is displayed when the user selects the telephone services icon 130. The Telephone Services Screen allows the user to perform functions associated with defining telephone connections. The Telephone Services Screen incorporates all of the elements of the Main Application Screen with the addition of a telephone services window 910 shown on the right hand portion of the display screen 110.

The call log window 910 contains a current call indicator 912, a new call indicator 914, an "Answer New Call" button 916, a "Send to VMS" button 918, a "Create 3-way Call" button 920, a "Hold Message" button 922, and a "Busy Message" button 924. The current call indicator 912 displays the name and telephone number of the user to whom the user is currently connected. The new call indicator 914 displays the name and telephone number of a new caller.

To answer the new call and terminate the current call the user must select the "Answer New Call" button 916. To connect the new call to the user's voice mail service the user must select the "Send To VMS" button 918. To add the new call to the current connection the user must select the "Create 3-way Call" button 920. To place the new call on hold and play a message informing the new caller that the call is on hold, the user must press the "Hold Message" button 922. To connect the new caller to a message informing the new caller that the user is busy, the user must press the "Busy Message" button 924.

News and Financial Screen

Figure 10:
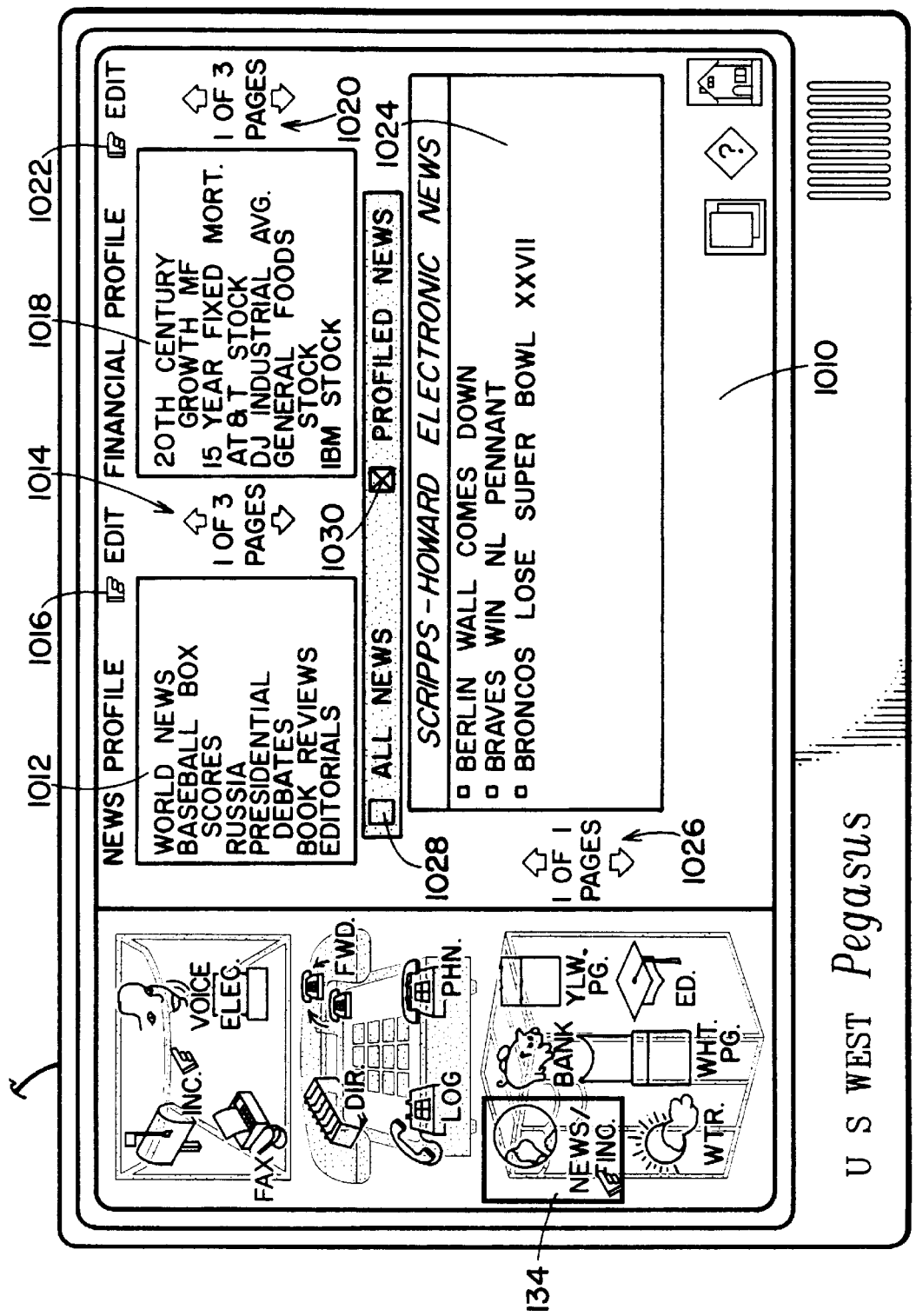
FIG. 10 is a screen display, hereinafter referred to as the News and Financial Services Screen illustrating the user interface method used by the present invention.

FIG. 10 shows the News and Financial Screen of the ATIS which is displayed when the user selects the news and financial icon 134. The News and Financial Screen allows the user to view selected news and financial information. The News and Financial Screen incorporates all of the elements of the Main Application Screen with the addition of a news and financial window 1010 shown on the right hand portion of the display screen 110. The news and financial window 1010 contains a news profile list 1012, news profile page controls 1014, a news profile "Edit" button 1016, a financial profile list 1018, financial profile page controls 1020, a financial profile "Edit" button 1022, an article list 1024, article list page controls 1026, an "All News" box 1028 and a "Profiled News" box 1030.

The news profile list 1012 permits the user to view the list of the user's preferred news topics. The news profile page controls 1014 allow the user to page through the news profile list 1012. The news profile "Edit" button 1016 allows the user to alter the contents of the news profile list 1012.

The financial profile list 1018 permits the user to view the list of the user's preferred financial topics. The financial profile page controls 1020 allow the user to page through the financial profile list 1018. The financial profile "Edit" button 1022 allows the user to alter the contents of the financial profile list 1018.

The article list 1024 permits the user to view a list of news and financial articles. The article page controls 1026 allow the user to page through the article list 1024. The "All News" box 1028 and the "Profiled news" box 1030 determine which articles are displayed in the article list 1024. To view all available articles the user must select the "All News" box 1028 causing an "X" to appear in the box. To view only articles relating to the new profile list 1012 or the financial profile list 1018 the user must select the "Profiled News" box 1030 causing an "X" to appear in the box.

White Pages Screens

Figure 11:
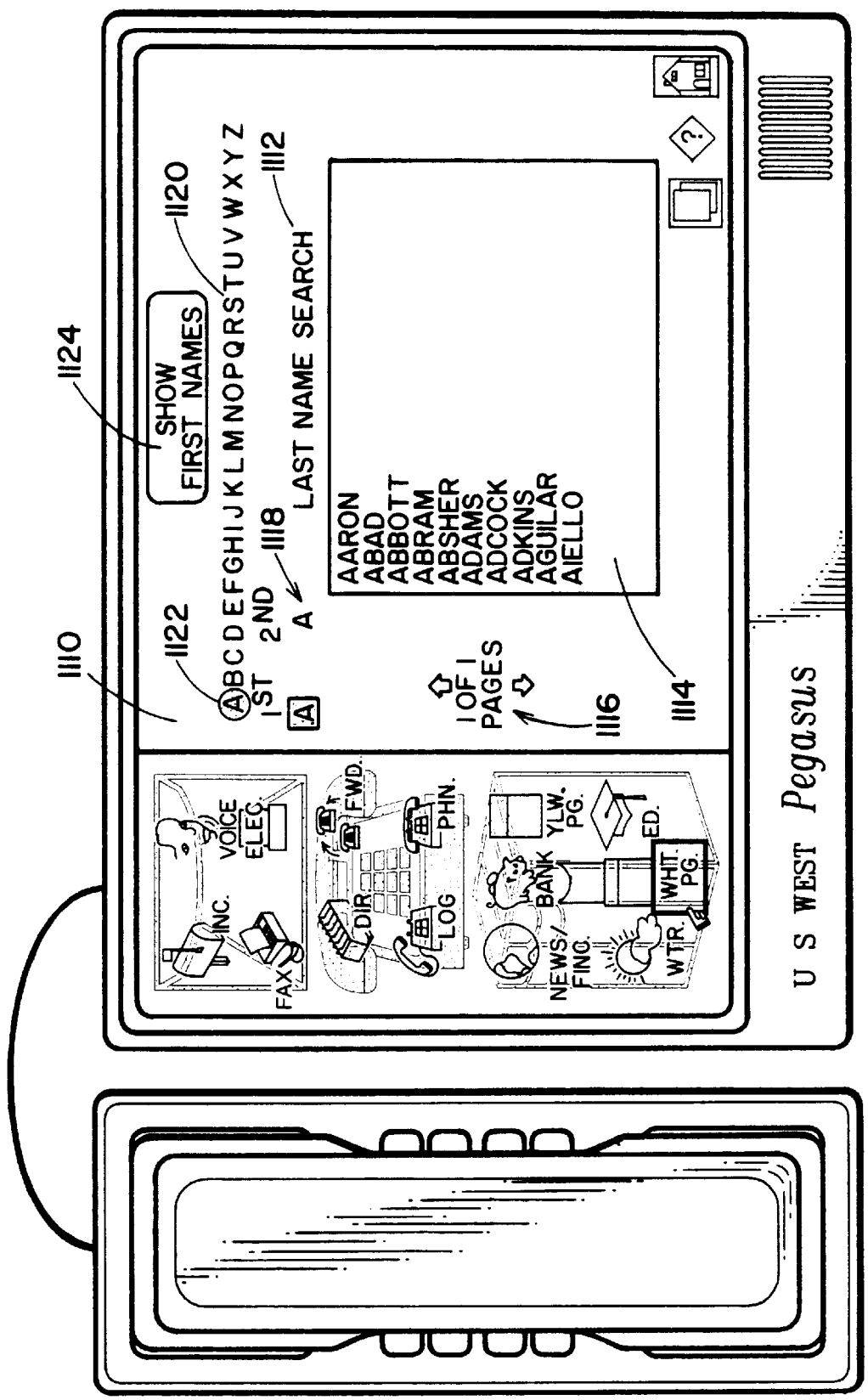
FIG. 11 is a screen display, hereinafter referred to as the White Pages Last Name Search Screen illustrating the user interface method used by the present invention.

FIG. 11 shows the first of two White Pages Screens of the ATIS which is displayed when the user selects the white pages icon 136. The White Pages Screens allow the user to search for desired entries in the on-line white pages directory. The White Pages Screens incorporate all of the elements of the Main Application Screen with the addition of a white pages window 1110 shown on the right hand portion of the display screen 110.

The white pages window 1110 of the first White Pages Screen contains a screen title 1112, a last name list 1114, last name page controls 1116, a search string 1118, an array of characters 1120, a letter indicator 1122 and a "Show First Names" button 1124. The screen title 1112 informs the user of the general purpose of the first White Pages Screen. The last name list 1114 permits the user to view an alphabetically arranged list of last names from the on-line white pages directory based on the search string 1118 and the last name page controls 1116. The last name page controls 1116 allow the user to page through the last name list 1112.

The search string 1118 is a combination of up to two alpha-numeric characters defined by the user. The user defines each position of the search string 1118 by positioning the letter indicator 1122 over the desired letter in the array of characters 1120. As the user defines each successive letter of the search string 1118, the last name list 1112 displays a list of names which are alphabetically equal to or greater than the search string 1118.

Once the search string 1118 has been defined, the user may use the last name page controls to further locate the desired entry. When the user locates the desired entry, the user must select the desired entry and press the "Show First Names" button 1124 to display the second White Pages Screen.

Figure 12:
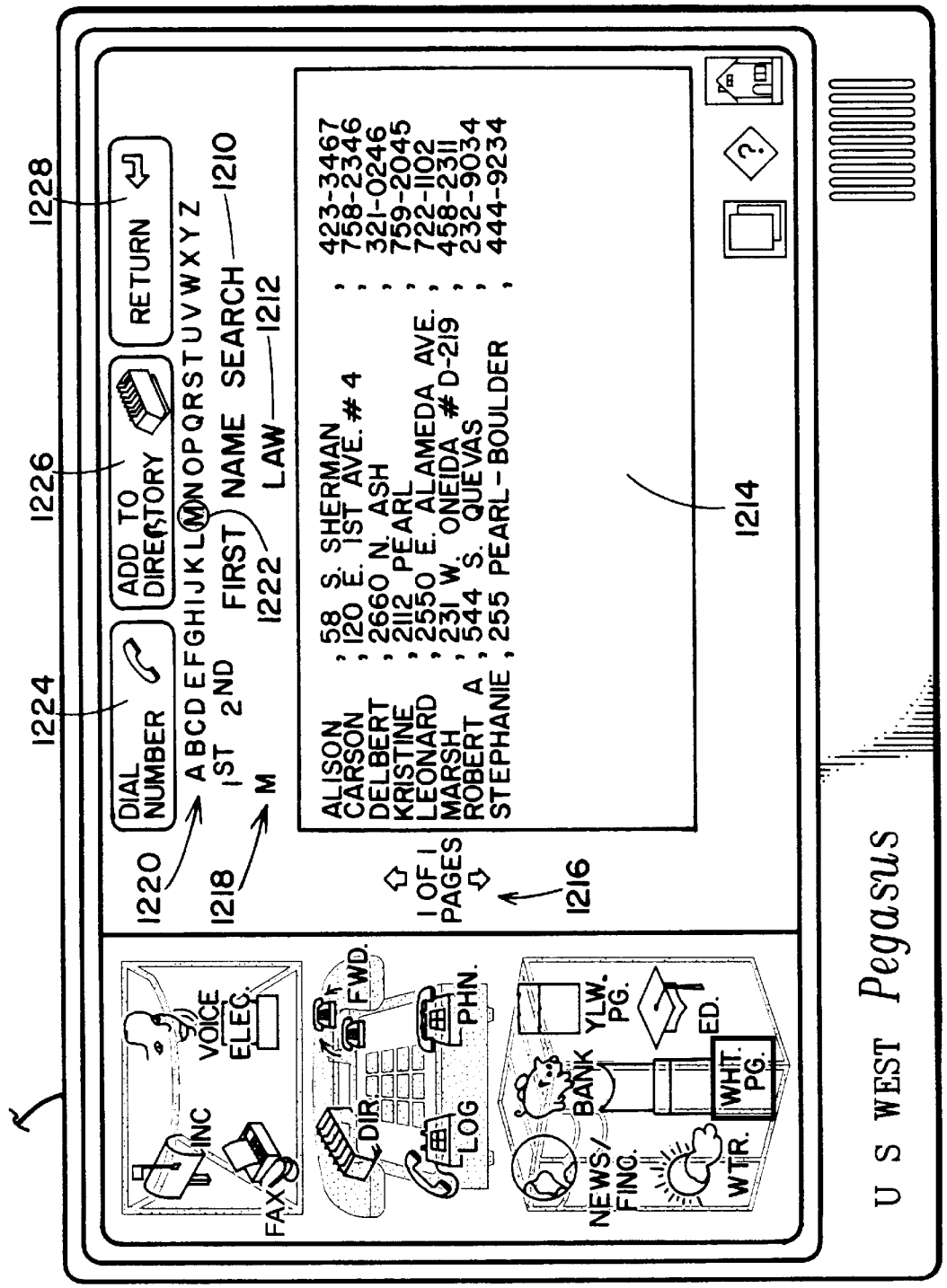
FIG. 12 is a screen display, hereinafter referred to as the White Pages First Name Search Screen illustrating the user interface method used by the present invention.

FIG. 12 shows the second White Pages Screen of the ATIS. This screen contains a screen title 1210, a last name display 1212, a first name list 1214, first name page controls 1216, a search string 1218, an array of characters 1220 and a letter indicator 1222, a "Dial Number" button 1224, an "Add To Directory" button 1226 and a "Return" button 1228. The screen title 1210 informs the user of the general purpose of the second White Pages Screen. The last name display 1212 indicates the last name selected by the user.

The first name list 1214 permits the user to view a list of alphabetically arranged list of first names from the on-line white pages directory based on last name display 1212, the search string 1218 and the first name page controls 1216. The first name page controls 1216 allow the user to page through the first name list 1212.

The search string 1218 is a combination of up to two alpha-numeric characters defined by the user. The user defines each position of the search string 1218 by positioning the letter indicator 1222 over the desired letter in the array of characters 1220. As the user defines each successive letter of the search string 1218, the first name list 1212 displays a list of names which are alphabetically equal to or greater than the search string 1218.

Once both characters of the search string 1218 have been defined, the user may use the first name page controls to further locate the desired entry. To dial the number of a desired entry, the user must select the desired entry and select the "Dial Number" button 1224. To add an entry to the user's personal directory the user must select the desired entry and select the "Add To Directory" button 1226. If the user wished to return to the first White Pages Screen the user must select the "Return" button 1228.

Yellow Pages Screens

Figure 13:
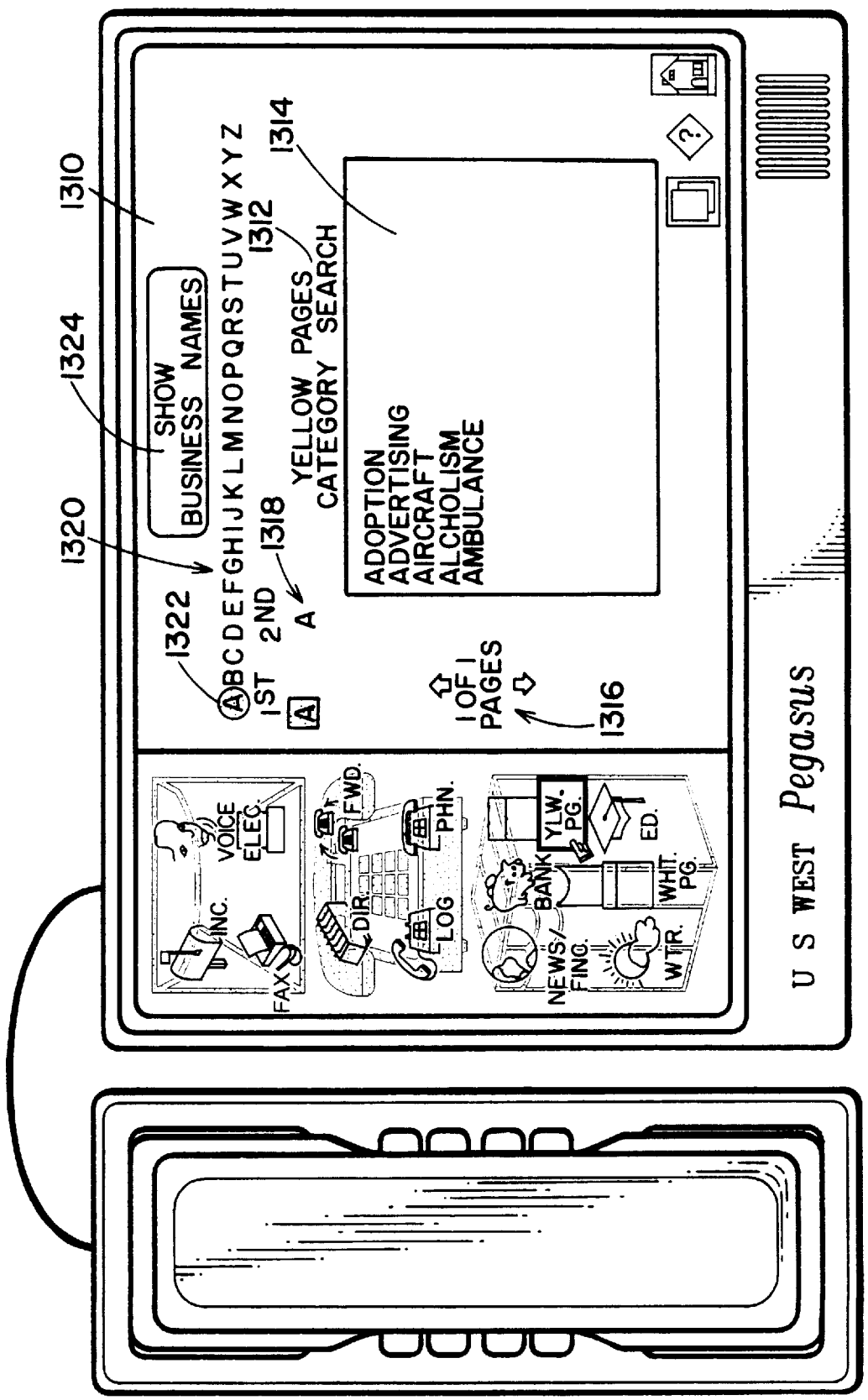
FIG. 13 is a screen display, hereinafter referred to as the Yellow Pages Category Search Screen illustrating the user interface method used by the present invention.

FIG. 13 shows the first of two Yellow Pages Screens of the ATIS which is displayed when the user selects the yellow pages icon 138. The Yellow Pages Screens allow the user to search for desired entries in the on-line yellow pages directory. The Yellow Pages Screens incorporate all of the elements of the Main Application Screen with the addition of a yellow pages window 1310 shown on the right hand portion of the display screen 110.

The yellow pages window 1310 of the first Yellow Pages Screen contains a screen title 1312, a category list 1314, category page controls 1316, a search string 1318, an array of characters 1320 and a letter indicator 1322 and a "Show Business Names" button 1324. The screen title 1312 informs the user of the general purpose of the first Yellow Pages Screen. The category list 1314 permits the user to view an alphabetically arranged list of categories from the on-line yellow pages directory based on the search string 1318 and the category page controls 1316. The category page controls 1316 allow the user to page through the category list 1312.

The search string 1318 is a combination of up to two alpha-numeric characters defined by the user. The user defines each position of the search string 1318 by positioning the letter indicator 1322 over the desired letter in the array of characters 1320. As the user defines each successive letter of the search string 1318, the category list 1312 displays a list of categories which are alphabetically equal to or greater than the search string 1318.

Once the search string 1318 has been defined, the user may use the category page controls 1316 to further locate the desired entry. When the user locates the desired entry, the user must select the desired entry and press the "Show Business Names" button 1324 to display the second Yellow Pages Screen.

Figure 14:
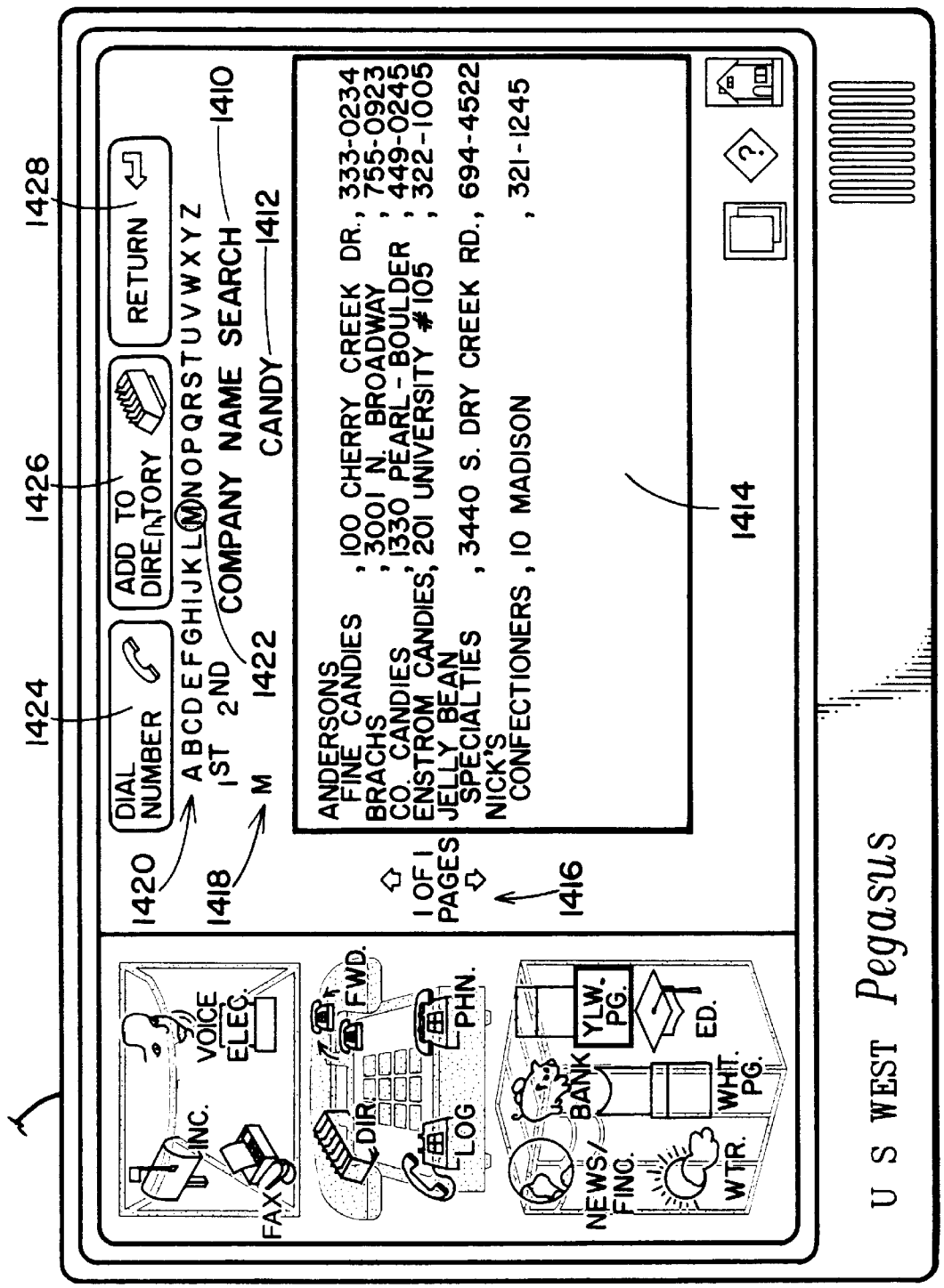
FIG. 14 is a screen display, hereinafter referred to as the Yellow Pages Company Name Search Screen illustrating the user interface method used by the present invention.

FIG. 14 shows the second Yellow Pages Screen of the ATIS. This screen contains a screen title 1410, a category display 1412, a company name list 1414, company name page controls 1416, a search string 1418, an array of characters 1420, a letter indicator 1422, a "Dial Number" button 1424, an "Add To Directory" button 1426 and a "Return" button 1428. The screen title 1410 informs the user of the general purpose of the second Yellow Pages Screen. The category display 1412 indicates the category selected by the user.

The company name list 1414 permits the user to view a list of alphabetically arranged company names from the on-line yellow pages directory based on category display 1412, the search string 1418 and the company name page controls 1416. The company name page controls 1416 allow the user to page through the company name list 1412.

The search string 1418 is a combination of up to two alpha-numeric characters defined by the user. The user defines each position of the search string 1418 by positioning the letter indicator 1422 over the desired letter in the array of characters 1420. As the user defines each successive letter of the search string 1418, the company name list 1412 displays a list of company names which are alphabetically equal to or greater than the search string 1418.

Once the search string 1418 has been defined, the user may use the company name page controls 1416 to further locate the desired entry. To dial the number of a desired entry, the user must select the desired entry and select the "Dial Number" button 1424. To add an entry to the user's personal directory the user must select the desired entry and select the "Add To Directory" button 1426. If the user wished to return to the first Yellow Pages Screen the user must select the "Return" button 1428.

Weather Screen

Figure 15:
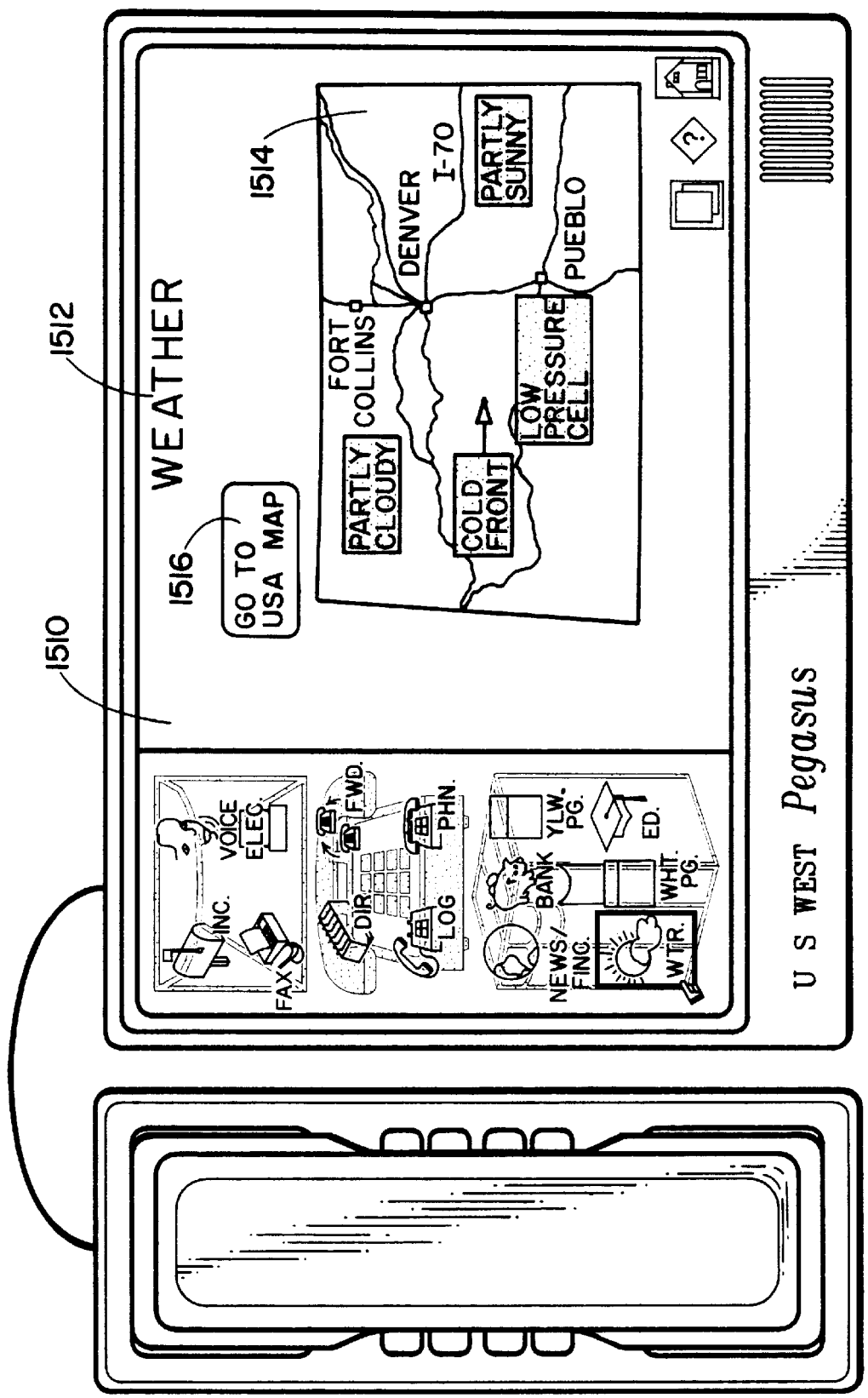
FIG. 15 is a screen display, hereinafter referred to as the Weather Services Screen illustrating the user interface method used by the present invention.

FIG. 15 shows a typical Weather Service Screen of the ATIS which is displayed when the user selects the weather service icon 140. The Weather Service Screen allows the user to view a variety of maps generated based on data from the National Weather Service. The Weather Service Screen incorporates all of the elements of the Main Application Screen with the addition of a weather service window 1510 shown on the right hand portion of the display screen 110.

The weather service window 1510 of the Weather Service Screen contains a screen title 1512, a weather map 1514, and a "Go To . . . " button 1516. The screen title 1512 informs the user of the general nature of the Weather Services Screen. The weather map 1514 presents the user with a map of a general geographic region and a number of more specific shaded geographic regions. The user may select a specific geographic region with the stylus to receive a new weather map of the selected region.

The weather map 1514 shown in FIG. 15 is a map of a portion of the United States. The "Go To . . . " button 1516 allows the user to display the next most general map. The next most general map for the Weather Service Screen shown in FIG. 15 is the world map. Selecting the "Go To World Map" button 1516 would display the world map in the weather service window.

Banking Screen

Figure 16:
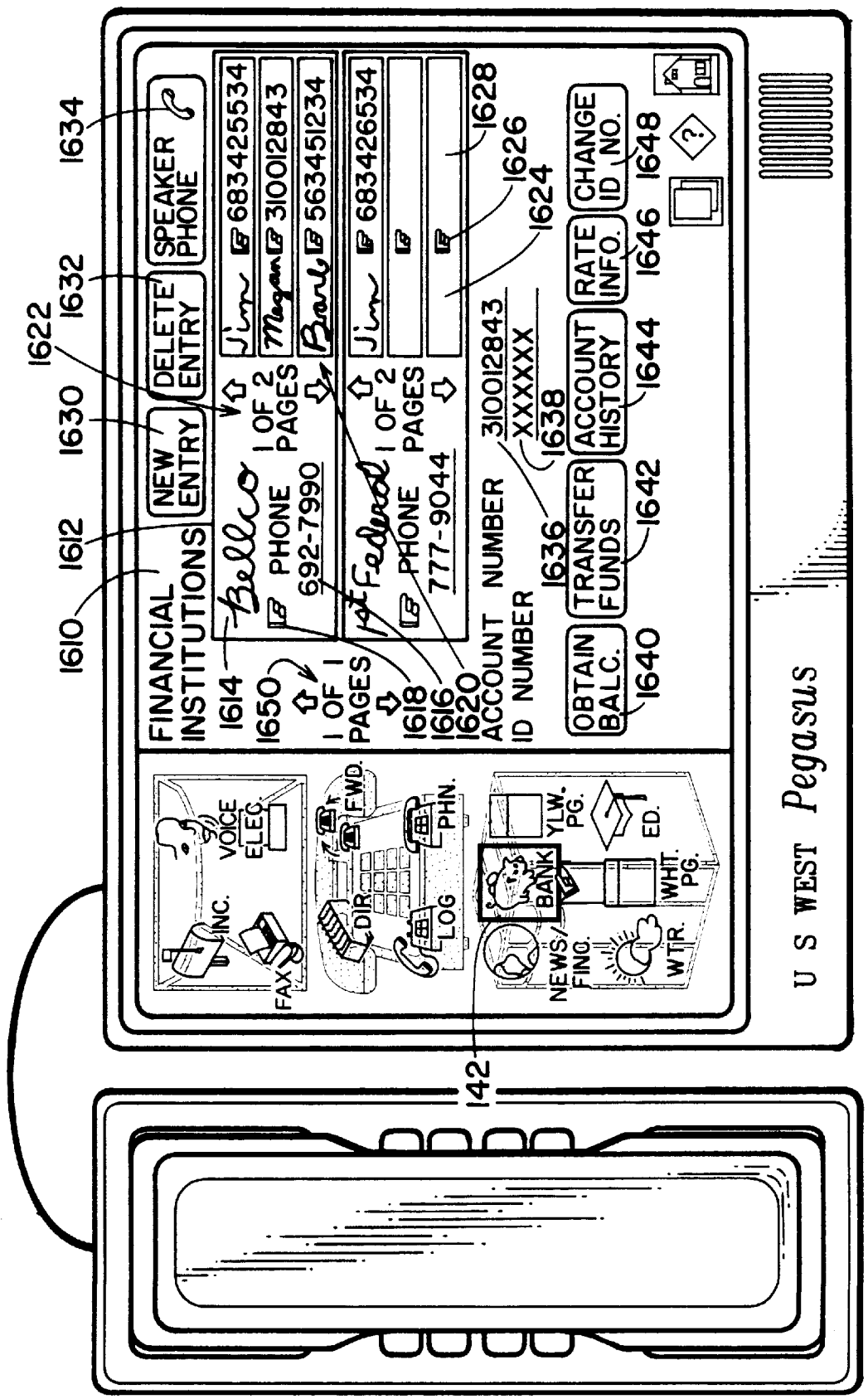
FIG. 16 is a screen display, hereinafter referred to as the Banking Services Screen illustrating the user interface method used by the present invention.

FIG. 16 shows the Banking Services Screen of the ATIS which is displayed when the user selects the banking services icon 142. The Banking Services Screen allows the user to perform functions associated with maintaining a list of financial institutions, reviewing account information and effecting financial transactions. The Banking Services Screen incorporates all of the elements of the Main Application Screen with the addition of a banking services window 1610 shown on the right hand portion of the display screen 110.

The banking services window 1610 contains a financial institution list 1612, financial institution list page controls 1650, financial institution buttons 1630–1634, account information 1636–1638 and account function buttons 1640–1648. The financial institution list 1612 permits the user to view and edit information regarding each of the user's financial institutions. The financial institution list page controls 1650 permit the user to page through the financial institution list.

Each entry in the financial institution list contains an identification area 1614, a telephone number field 1616, a telephone number edit button 1618, an account list 1620 and account list page controls 1622. To edit the identification area 1614 of a financial institution entry the user must simply select the identification area 1614 with the stylus and write the new identification. To exit the editing process the user must select another object on the screen.

To edit the telephone number field 1616 of a financial institution entry the user must select the telephone number edit button 1618. To instruct the ATIS to call a financial institution the user must select the telephone number field 1616.

Each entry in the account list 1620 contains an account identification area 1624, an account number edit button 1626 and an account number field 1628. The account list page controls 1622 allow the user to page through the account list 1620 associated with a financial institution entry. To edit the account identification area 1624 the user must select the account identification area 1624 and write the new identification using the stylus. To edit the account number field 1626, the user must select the account number edit button 1628.

Selecting the "New Entry" button 1630 allows the user to add a financial institution to the financial institution list 1612. To delete a financial institution entry the user must first select the entry to be deleted. The user must then select the "Delete Entry" button 1632. Selecting the "Speaker Phone" button 1634 enables the speaker phone.

To select an account on which to effect financial transactions the user must simply select the appropriate account number 1626 from the account list 1620. The account number display 1636 and the identification number display 1638 will reflect the selection.

To display the balance of the selected account the user must press the "Obtain Balance" button 1640. To transfer funds from the selected account the user must press the "Transfer Funds" button 1642. To view the history of the selected account the user must press the "Account History" button 1644. To view information regarding the interest rate applied to the selected account the user must press the "Rate Information" button 1646. To alter the identification number the user must press the "Change ID Number" button 1648.

Educational Reference Screen

Figure 17:
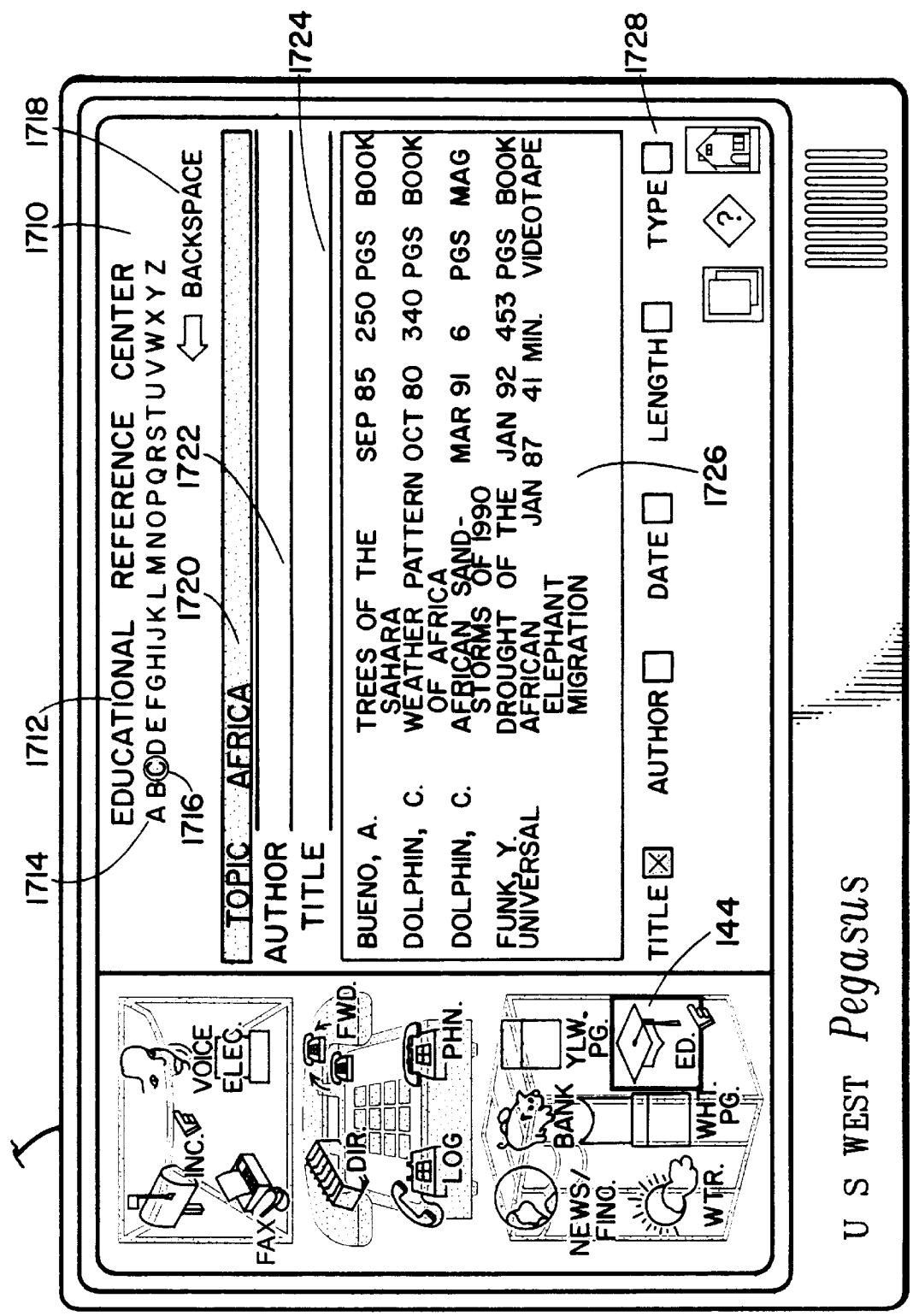
FIG. 17 is a screen display hereinafter referred to as the educational reference center screen illustrating the user interface method used by the present invention.

FIG. 17 shows the Educational Reference Screen of the ATIS which is displayed when the user selects the educational reference icon 144. The Educational Reference Screen allows the user to perform functions associated with accessing information. The Educational Reference Screen incorporates all of the elements of the Main Application screen with the addition of a reference window 1710 shown on the right hand portion of the display screen.

The educational reference window 1710 of the Educational Reference Screen contains a screen title 1712, an array of characters 1714, a letter indicator 1716, a backspace icon 1718, a topic field 1720, an author field 1722, a title field 1724, a reference list 1726 and a set of sort selectors 1728. The screen title 1712 informs the user of the general purpose of the Educational Reference Screen.

The topic field 1720, the author field 1722 and the title field 1724 allow the user to search for references by topic, author and title, respectively. The user defines these fields using the array of characters 1714, the letter indicator 1716 and the backspace icon 1718. After the user has defined the reference search parameters, the references meeting the search parameters will be listed in the reference list 1726. The user may sort the reference list by selecting one of the sort selectors 1728.

Home Memo Screen

Figure 18:
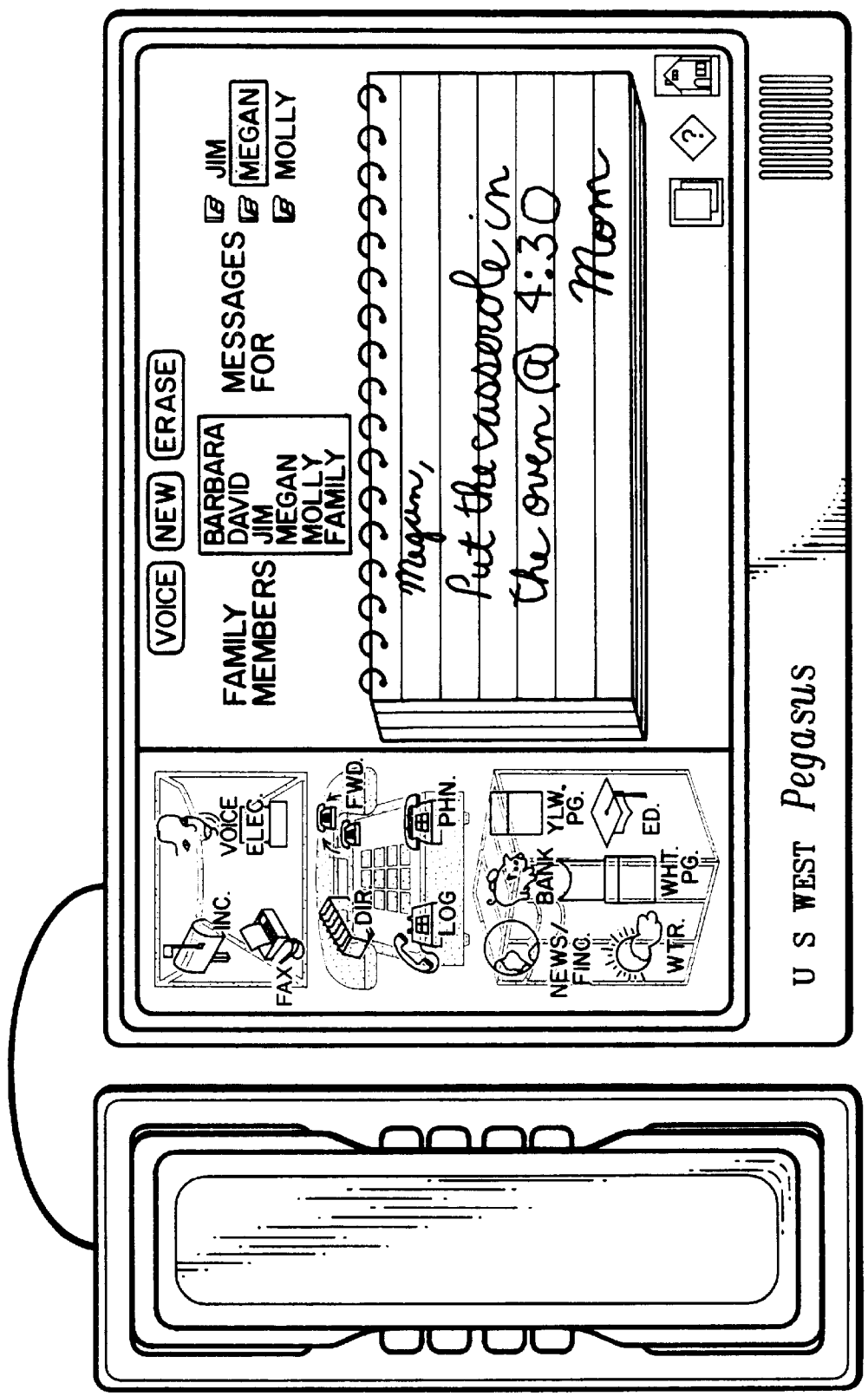
FIG. 18 is a screen display, hereinafter referred to as the Home Memo Screen illustrating the user interface method used by the present invention.

FIG. 18 shows the Home Memo Screen of the ATIS which is displayed when the user selects the home memo icon 148. The Home Memo Screen allows the user to send messages to and receive messages from other family members. The Home Memo Screen incorporates all of the elements of the Main Application Screen with the addition of a home memo window 1810 shown on the right hand portion of the display screen 110.

The Home Memo application allows the user to leave a voice annotated message for other family members. This is done by composing a graphical message using the stylus (or other available interaction tools). Then, the user can create a voice message which will be played simultaneously as the visual message is displayed.

The user designates at least one recipient of the message by selecting from the list of family members. The MESSAGES FOR section of the Home Memo screen lists those family members that have messages. By selecting a single entry on the MESSAGES FOR list, each family member can view and listen to their message.

Figure 19:
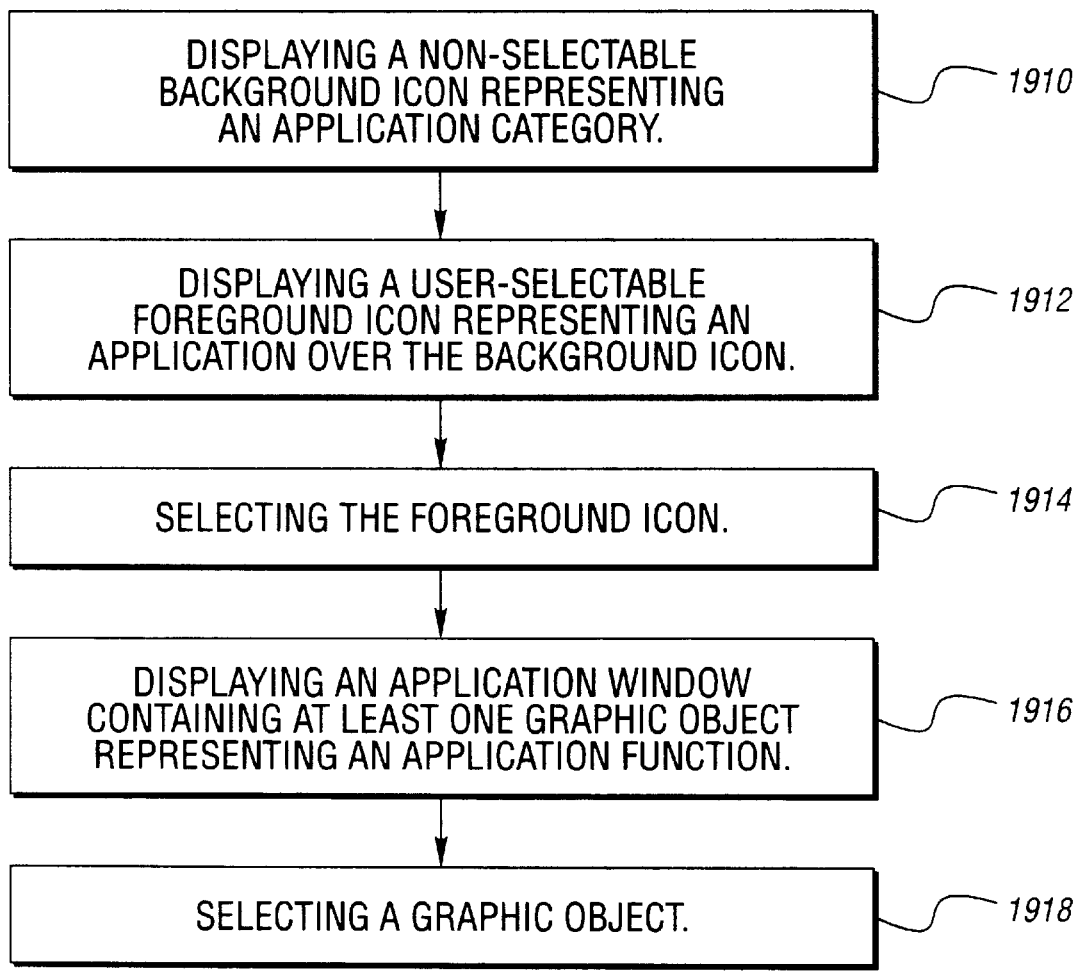
FIG. 19 is a flow chart illustrating the method steps of the present invention.

Referring now to FIG. 19, there is shown a flow chart illustrating the method steps of the present invention. Block 1910 shows the step of using the display screen to display a non-selectable low intensity background icon. The background icon represents an application category for related applications.

Block 1912 shows the step of using the display screen to display a user selectable foreground icon superimposed over the background icon. The foreground icon represents an application included in the application category represented by the background icon. The application represented by the foreground icon includes at least one function.

Block 1914 shows the step of selecting the foreground icon using a pointing device to identify the application. The step of selecting the foreground icon initiates the application represented by the icon.

Block 1916 shows the step of using the display screen to display an application window. The application window contains at least one graphic object representing the at least one function of the application.

Block 1918 shows the step of selecting one of the graphic objects displayed in the application window. The step of selecting identifies the function to be performed.

While the best mode for carrying out the invention has been described in detail, those familiar with the art to which this invention relates will recognize various alternative designs and embodiments for practicing the invention as defined by the following claims.

What is claimed is:

1. A method for processing and presenting graphic objects at a telephone station at which a user is capable of performing a number of functions, the telephone station including a computer and a display device connected to the computer, the display device having a display screen adapted to cooperate with a pointing device for inputing data to the computer through the display device and for selecting the graphic objects displayed on the display screen, the method comprising the steps of:

displaying on the display screen at least one non-selectable low intensity background icon representing an application category for applications having commonality;

displaying on the display screen at least one user selectable foreground icon superimposed over a background icon, the foreground icon representing an application having a group of functions, the foreground icon occupying a surface area less than the surface area of the background icon;

selecting one of the foreground icons using the pointing device to identify the application;

displaying an application window on the display screen based on the step of selecting, the application window containing at least one graphic object, the at least one graphic object representing one of the functions; and selecting the at least one graphic object displayed on the display screen using the pointing device to identify the function to be performed.

2. The method of claim 1 wherein the step of displaying an application window includes the step of redisplaying the background icons and foreground icons on the display screen.

3. The method of claim 1 wherein the step of displaying an application window includes the step of visually highlighting the selected foreground icon on the display screen.

4. The method of claim 1 further comprising the step of displaying an advertising window on the display screen.

5. The method of claim 1 further comprising the steps of:

displaying at least one graphic input object on the display screen to prompt the user of the system to input data with the pointing device required by the identified function; and transmitting the input data to the computer using the pointing device to select the at least one input object on the display screen.

6. The method of claim 5 wherein the at least one graphic input object is selected from the group consisting essentially of buttons, icons, graphic tablets and text.

7. The method of claim 5 wherein the step of transmitting the input data includes using the pointing device to create handwritten messages on the screen display.

8. The method of claim 5 wherein the step of transmitting the input data includes the step of converting analog audio data into digital audio data at the telephone station.

9. A system for processing and presenting graphic objects at a telephone station at which a user is capable of performing a number of functions, the telephone station including a computer and a display device connected to the computer, the display device having a display screen adapted to cooperate with a pointing device for inputing data to the computer through the display device and for selecting graphic objects displayed on the display screen, the system comprising the steps of:

means for displaying on the display screen at least one non-selectable low intensity background icon representing an application category for applications having commonality, means for displaying on the display screen at least one user selectable foreground icon superimposed over a background icon, the foreground icon representing an application having a group of functions, the foreground icon occupying a surface area less than the surface area of the background icon;

means for detecting a selection of one of the foreground icons;

means for displaying an application window on the display screen based on the step of selecting, the application window containing at least one graphic object, the at least one graphic object representing one of the functions; and means for detecting a selection of the at least one graphic object on the display screen.

10. The system of claim 9 wherein the means for displaying an application window includes means for redisplaying the background icons and foreground icons on the display screen.

11. The system of claim 9 wherein the means for displaying an application window includes means for visually highlighting the selected foreground icon on the display screen.

12. The system of claim 9 wherein the pointing device is operable by the user to input data to the computer through the display device and to select objects displayed on the display screen by touching the display screen.

13. The system of claim 9 further comprising means for displaying an advertising window on the display screen.

14. The system of claim 9 further comprising:

means for displaying at least one input object on the display screen to prompt the user of the system to input data with the pointing device required by the identified function; and means for transmitting the input data to the computer using the pointing device to select the at least one input object on the display screen.

15. The system of claim 14 wherein the means for transmitting the input data includes means for creating handwritten messages on the screen display.

16. The system of claim 14 wherein the means for transmitting the input data includes means for converting analog audio data into digital audio data at the telephone station.

* * * * *